(12) United States Patent
Whelan et al.

(10) Patent No.: US 11,485,574 B2
(45) Date of Patent: Nov. 1, 2022

(54) TRANSPORTING DEVICE POSITION DETERMINING APPARATUS AND METHOD

(71) Applicant: Ocado Innovation Limited, Hatfield (GB)

(72) Inventors: Matthew Whelan, Hatfield (GB); David Sharp, Hatfield (GB); David Brown, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 52 days.

(21) Appl. No.: 16/979,270

(22) PCT Filed: Mar. 7, 2019

(86) PCT No.: PCT/EP2019/055703
§ 371 (c)(1),
(2) Date: Sep. 9, 2020

(87) PCT Pub. No.: WO2019/170805
PCT Pub. Date: Sep. 12, 2019

(65) Prior Publication Data
US 2020/0399060 A1    Dec. 24, 2020

(30) Foreign Application Priority Data

Mar. 9, 2018 (GB) ...................... 1803771

(51) Int. Cl.
*B65G 1/04* (2006.01)
*G05D 1/02* (2020.01)

(52) U.S. Cl.
CPC ......... *B65G 1/0464* (2013.01); *G05D 1/0234* (2013.01); *G05D 1/0246* (2013.01);
(Continued)

(58) Field of Classification Search
CPC .......... B65G 1/0464; B65G 2203/0283; B65G 2203/041; B65G 2209/04; G05D 1/0234; G05D 1/0246; G05D 2201/0216
See application file for complete search history.

(56) References Cited

U.S. PATENT DOCUMENTS 6,377,888 B1    4/2002  Olch
7,850,412 B2 * 12/2010  Benedict ................. B63C 15/00
                                                           414/281
(Continued)

FOREIGN PATENT DOCUMENTS

CA    3 017 833 A1    9/2017
EP    3762799 A1    1/2021
(Continued)

OTHER PUBLICATIONS

Office Action (Communication pursuant to Article 94(3) EPC) dated Jul. 29, 2021, by the European Patent Office in corresponding European Patent Application No. 19 709 481.6-1202. (10 pages).
(Continued)

*Primary Examiner* — Saul Rodriguez
*Assistant Examiner* — Ashley K Romano
(74) *Attorney, Agent, or Firm* — Buchanan Ingersoll & Rooney PC

(57) ABSTRACT

A control unit is provided to improve positioning of transporting devices to thereby allow transporting devices to be driven at faster speeds and/or accelerations with minimal positional errors allowing for a reduction in the spacing between transporting devices. A control unit is arranged to control movement of at least one transporting device for containers stored in a facility having a plurality of pathways arranged in cells so as to form a grid-like structure above the stacks which extends in a first direction and in a second direction. The control unit includes a receiving unit arranged to receive information from a first sensor mounted on the at
(Continued)

least one transporting device, and a calculating unit arranged to calculate a position of the at least one transporting device based on the received information.

17 Claims, 17 Drawing Sheets

(52) U.S. Cl.
CPC ............... *B65G 2203/0283* (2013.01); *B65G 2203/041* (2013.01); *B65G 2209/04* (2013.01); *G05D 2201/0216* (2013.01)

(56) References Cited

U.S. PATENT DOCUMENTS

| | | | |
|---|---|---|---|
| 7,912,574 | B2 | 3/2011 | Wurman et al. |
| 8,606,392 | B2 | 12/2013 | Wurman et al. |
| 9,519,284 | B2 | 12/2016 | Wurman et al. |
| 9,548,230 | B2 * | 1/2017 | Iwasaki ............... H01L 21/6773 |
| 10,037,908 | B2 * | 7/2018 | Ota .................... H01L 21/67736 |
| 10,067,501 | B2 | 9/2018 | Wurman et al. |
| 10,133,267 | B2 | 11/2018 | Wurman et al. |
| 10,809,706 | B2 | 10/2020 | Wurman et al. |
| 10,990,088 | B2 | 4/2021 | Wurman et al. |
| 2002/0165648 | A1 | 11/2002 | Zeitler |
| 2007/0293978 | A1 | 12/2007 | Wurman et al. |
| 2011/0060449 | A1 | 3/2011 | Wurman et al. |
| 2011/0170118 | A1 | 7/2011 | Mika et al. |
| 2014/0100690 | A1 | 4/2014 | Wurman et al. |
| 2015/0307276 | A1 | 10/2015 | Hognaland |
| 2015/0371181 | A1 | 12/2015 | Palamarchuk et al. |
| 2016/0126120 | A1 * | 5/2016 | Oza .................... H01L 21/67733 700/121 |
| 2016/0145058 | A1 * | 5/2016 | Lindbo .................. B65G 61/00 700/218 |
| 2016/0229630 | A1 | 8/2016 | Gebhardt et al. |
| 2016/0304278 | A1 | 10/2016 | Hognaland |
| 2017/0038770 | A1 | 2/2017 | Wurman et al. |
| 2017/0129706 | A1 | 5/2017 | Hognaland |
| 2017/0233187 | A1 * | 8/2017 | Fukushima ....... H01L 21/67769 414/279 |
| 2017/0291803 | A1 | 10/2017 | Hognaland |
| 2018/0072546 | A1 | 3/2018 | Hognaland |
| 2018/0148259 | A1 * | 5/2018 | Gravelle .............. B65G 1/0464 |
| 2018/0196413 | A1 | 7/2018 | Wurman et al. |
| 2018/0354893 | A1 | 12/2018 | Wurman et al. |
| 2019/0002255 | A1 | 1/2019 | Hognaland |
| 2019/0047786 | A1 | 2/2019 | Suzuki |
| 2019/0064785 | A1 | 2/2019 | Wurman et al. |
| 2020/0031640 | A1 | 1/2020 | Hognaland |
| 2020/0262649 | A1 | 8/2020 | Hognaland |

FOREIGN PATENT DOCUMENTS

| | | |
|---|---|---|
| JP | 2012197184 A | 10/2012 |
| JP | 2016506346 A | 3/2016 |
| WO | 9849075 A1 | 11/1998 |
| WO | 2015019055 A1 | 2/2015 |
| WO | 2015185628 A2 | 12/2015 |
| WO | 2017037095 A1 | 3/2017 |
| WO | 2017150006 A1 | 9/2017 |
| WO | 2019170805 A1 | 9/2019 |

OTHER PUBLICATIONS

Office Action (Notification of Reason for Refusal) dated Jan. 19, 2022, by the Korean Patent Office in corresponding Korean Patent Application No. 10-2020-7028674, and an English Translation of the Office Action. (17 pages).
Office Action (Examination Report) dated May 10, 2021, by the Great Britain Patent Office in corresponding Great Britain Patent Application No. GB1903044.4. (2 pages).
International Search Report and Written Opinion issued in corresponding International Patent Application No. PCT/EP2019/055703, 13 pages (dated May 15, 2020).
First Office Action dated Nov. 9, 2021, by the Japanese Patent Office in corresponding Japanese Patent Application No. 2020-570640, and an English Translation of the Office Action. (10 pages).
Office Action (Examination Report No. 2) dated Oct. 18, 2021, by the Australian Patent Office in corresponding Australian Patent Application No. 2019229638. (4 pages).
Office Action dated Oct. 6, 2021, by the Canadian Patent Office in corresponding Canadian Patent Application No. 3,092,422. (4 pages).
Office Action (Communication) dated Feb. 28, 2022, by the European Patent Office in corresponding European Patent Application No. 19709481.6. (8 pages).
Final Office Action dated Jul. 26, 2022, by the Japanese Patent Office in corresponding Japanese Patent Application No. 2020-570640, and an English Translation of the Office Action. (5 pages).
Office Action dated Aug. 22, 2022, by the Great Britain Patent Office in corresponding Great Britain Patent Application No. GB1903044.4. (4 pages).

* cited by examiner

| | | | | | | | | |
|---|---|---|---|---|---|---|---|---|
| | | 1373-2058 | | 2745-3430 | | | | 1201 |
| | | 687-1372 | | 2059-2744 | | | | |
| | | | 0-686 | | 1373-2058 | | 2745-3430 | |
| | | | -686-0 | | 687-1372 | | 2059-2744 | |
| | 2745-3430 | -1372--687 | 2745-3430 | | 0-686 | 2745-3430 | 1373-2058 | 2745-3430 |
| | 2059-2744 | 2059-2744 | 2059-2744 | | -686-0 | 2059-2744 | 687-1372 | 2059-2744 |
| | 1373-2058 | 1373-2058 | 1373-2058 | | -1372--687 | 1373-2058 | 0-686 | 1373-2058 |
| | 687-1372 | 687-1372 | 687-1372 | | | 687-1372 | -686-0 | 687-1372 |
| | 0-686 | | 0-686 | | | 0-686 | -1372--687 | 0-686 |

TRANSPORTING DEVICE POSITION DETERMINING APPARATUS AND METHOD

This application claims priority from UK Patent Application No. 1803771.3 filed 9 Mar. 2018, the content of all this application hereby being incorporated by reference.

TECHNICAL FIELD

The present invention relates generally to the field of controlling transporting devices. More specifically to an apparatus and method for determining a position of a transporting device.

BACKGROUND

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices (also known as 'transporting devices') operative on tracks located on the top of the frame structure. The load handling devices lift bins or containers out from the stacks, multiple load handling devices co-operating to access bins or containers located in the lowest positions of the stack. A system of this type is illustrated schematically in FIGS. 1 to 4 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. FIG. 1 is a schematic perspective view of the framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 3a and 3b are schematic perspective views of a load handling device 30 from the rear and front, respectively, and FIG. 3c is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 3c. The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34,36. As shown in FIG. 4, a plurality of identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 4, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port 24 for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

Moreover, accurate positioning of each of the load handling devices 30 is difficult is achieve. Existing systems may utilise a wheel (in contact with a rail) and encoder to measure the distance moved by a load handling device 30 by counting the revolutions of the wheel and thereby calculate the position of the load handling device 30.

Without sufficiently accurate positioning, load handling devices 30 may collide with obstacles and/or fail to stop on top of the appropriate container to be moved/placed. Therefore, existing systems utilise relatively large gaps between load handling devices 30 to minimise collisions.

Moreover, load handling devices 30 are typically driven at speeds less than their maximum potential so as to minimise errors in location determination.

SUMMARY

In view of the problems in known load handling systems, the present invention aims to provide an apparatus and method for such a load handling system such that accurate positioning of each load handling device is achieved to thereby allow load handling devices to be driven at faster speeds and/or accelerations with minimal positional errors allowing for a reduction in the spacing between load handling devices.

In general terms, the invention introduces means for scanning/capturing the environment around the load handling device to more accurately determine the position of the load handling device. Moreover, the invention reduces the risk of accumulated error over large pitches of grid structure where a dead reckoning encoder wheel may not be accurate enough.

According to the present invention there is provided a control unit arranged to control movement of at least one transporting device, the at least one transporting device arranged to transport containers, the containers being stored in a facility, the facility arranged to store the containers in a plurality of stacks, the facility comprising a plurality of pathways arranged in cells so as to form a grid-like structure above the stacks, wherein the grid-like structure extends in a first direction and in a second direction, the at least one transporting device arranged to operate on the grid-like structure. The control unit comprises a receiving unit arranged to receive information from a first sensor mounted on the at least one transporting device. The control unit further comprises a calculating unit arranged to calculate a position of the at least one transporting device based on the received information.

The present invention also provides a storage system. The storage system comprises a first set of parallel rails or tracks extending in an X-direction, and a second set of parallel rails or tracks extending in a Y-direction transverse to the first set in a substantially horizontal plane to form a grid pattern comprising a plurality of grid spaces, a plurality of stacks of containers located beneath the rails, and arranged such that each stack is located within a footprint of a single grid space, at least one transporting device comprising a first sensor, the at least one transporting device being arranged to selectively move laterally in the X and Y directions, above the stacks on the rails and a control unit as previously described.

The present invention also provides a method of controlling movement of at least one transporting device, the at least one transporting device arranged to transport containers, the containers being stored in a facility, the facility arranged to store the containers in a plurality of stacks, the facility comprising a plurality of pathways arranged in cells so as to form a grid-like structure above the stacks, wherein the grid-like structure extends in a first direction and in a second direction, the at least one transporting device arranged to operate on the grid-like structure. The method comprises the steps of receiving information from a first sensor mounted on the at least one transporting device and calculating a position of the at least one transporting device based on the received information.

BRIEF DESCRIPTION OF THE DRAWINGS

Embodiments of the invention will now be described by way of example only with reference to the accompanying drawings, in which like reference numbers designate the same or corresponding parts, and in which:

FIG. 12 is an example of a predetermined layout of barcodes on the rails.

DETAILED DESCRIPTION OF EMBODIMENTS

First Embodiment

Figure 1:
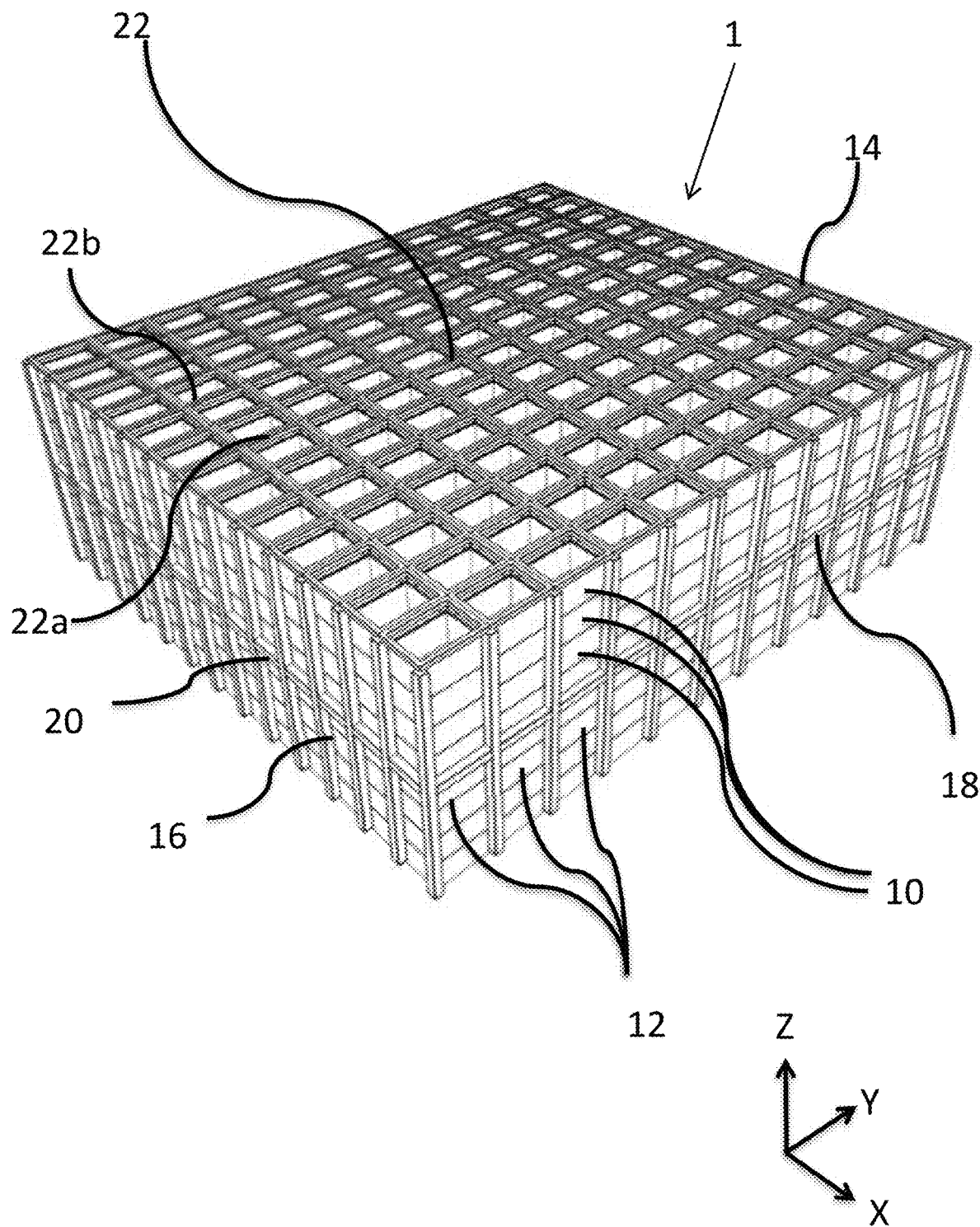
FIG. 1 is a schematic diagram of a framework structure according to a known system.
Figure 2:
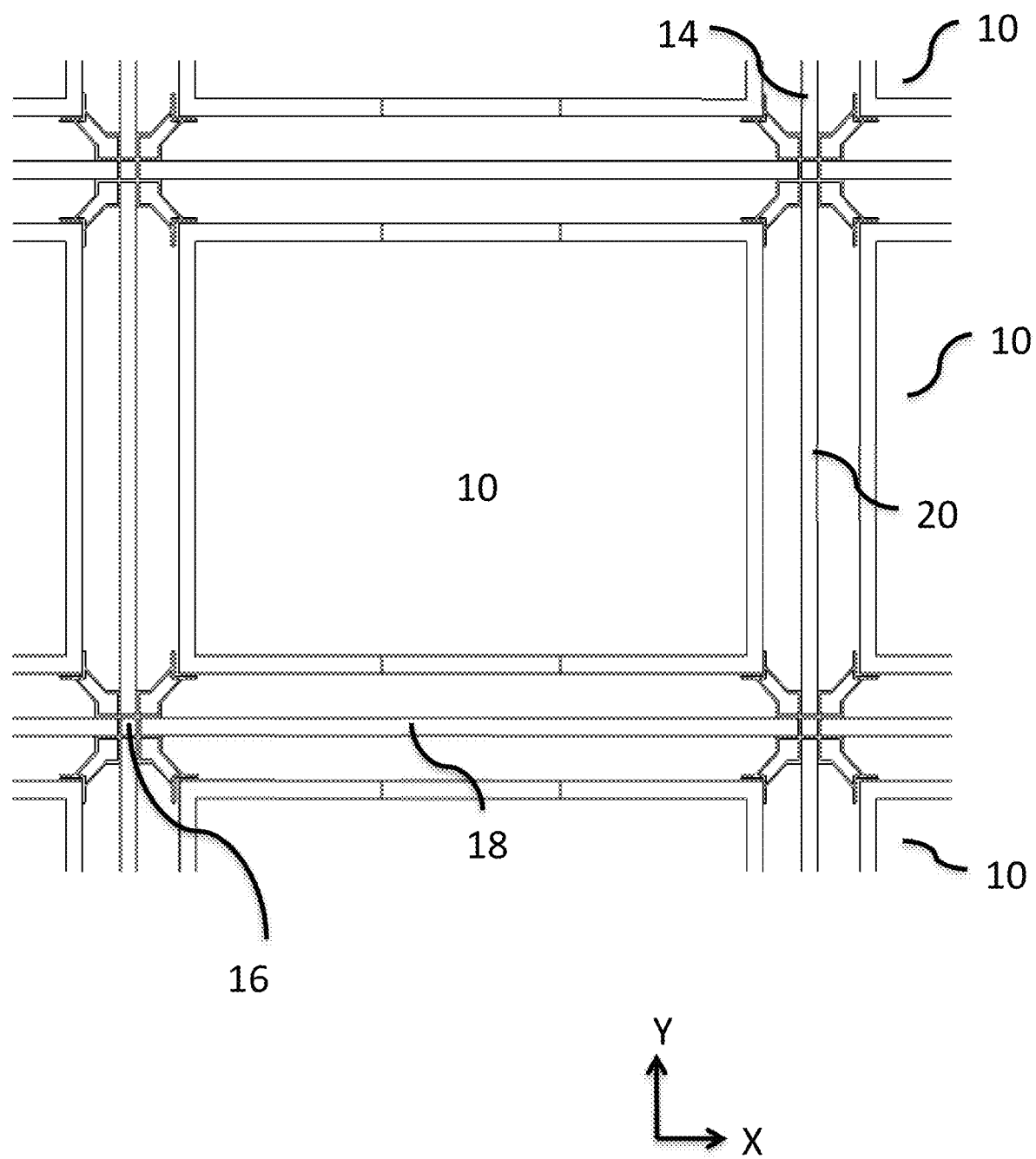
FIG. 2 is a schematic diagram of a top-down view showing a stack of bins arranged within the framework structure of FIG. 1.
Figure 3C:
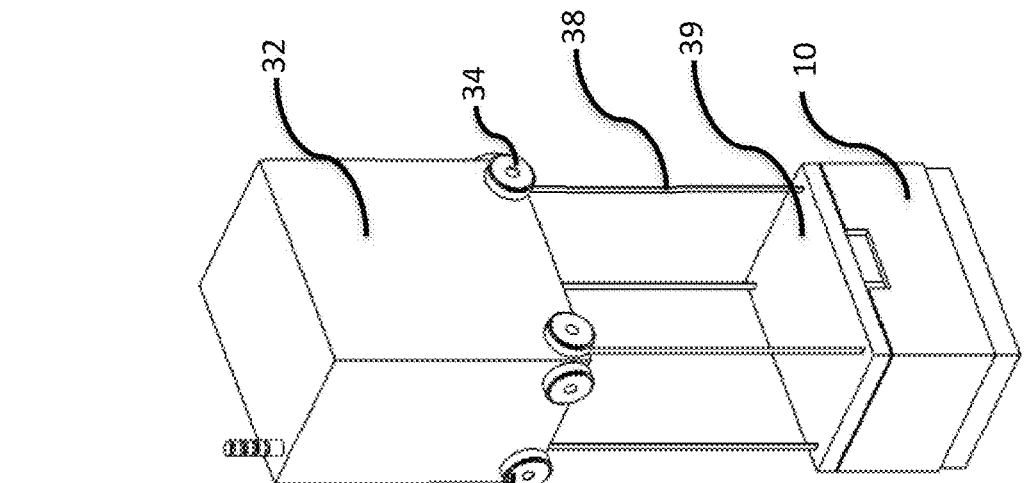
FIG. 3c is a schematic front perspective view of a load handling device lifting a bin.
Figure 3B:
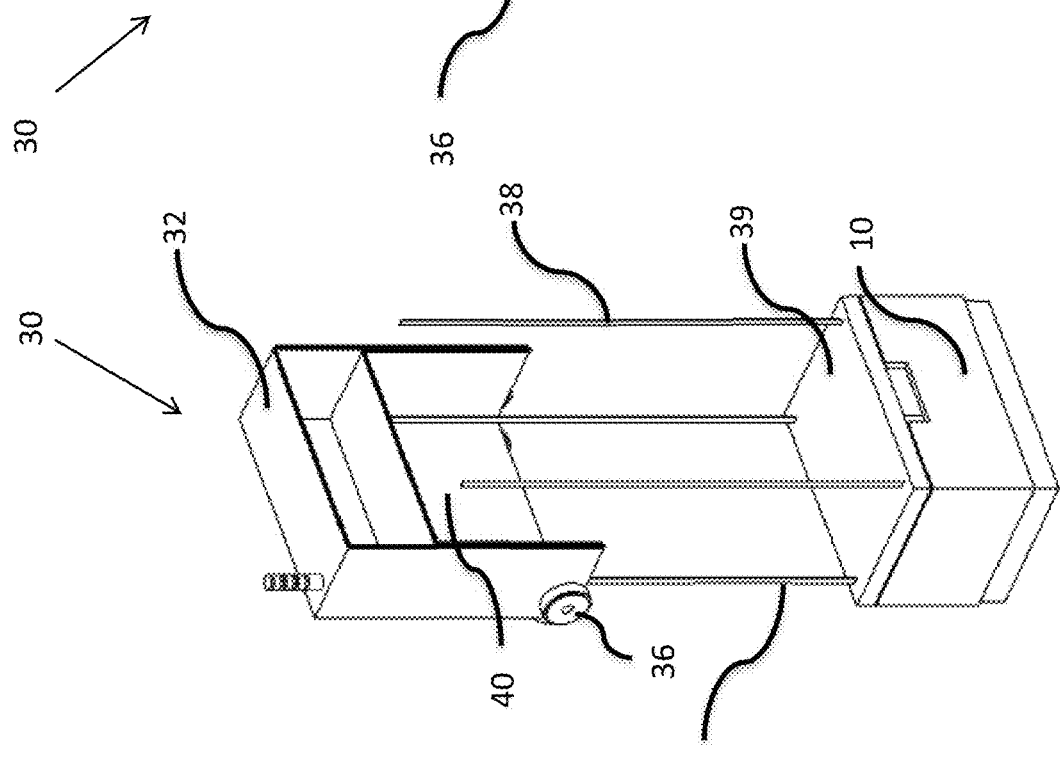
FIGS. 3a and 3b are schematic perspective views of a load handling device from the rear and front, respectively.
Figure 3A:
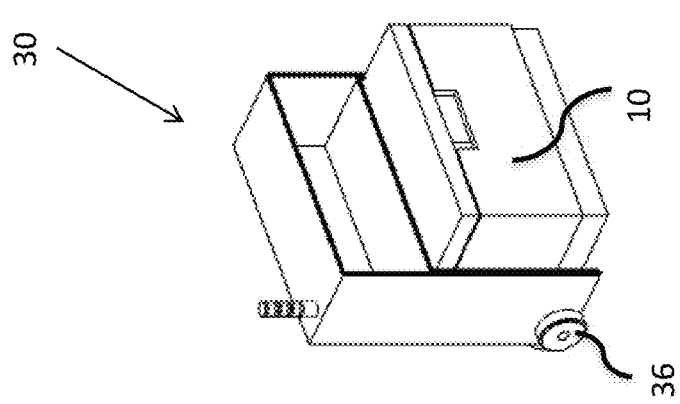
Figure 4:
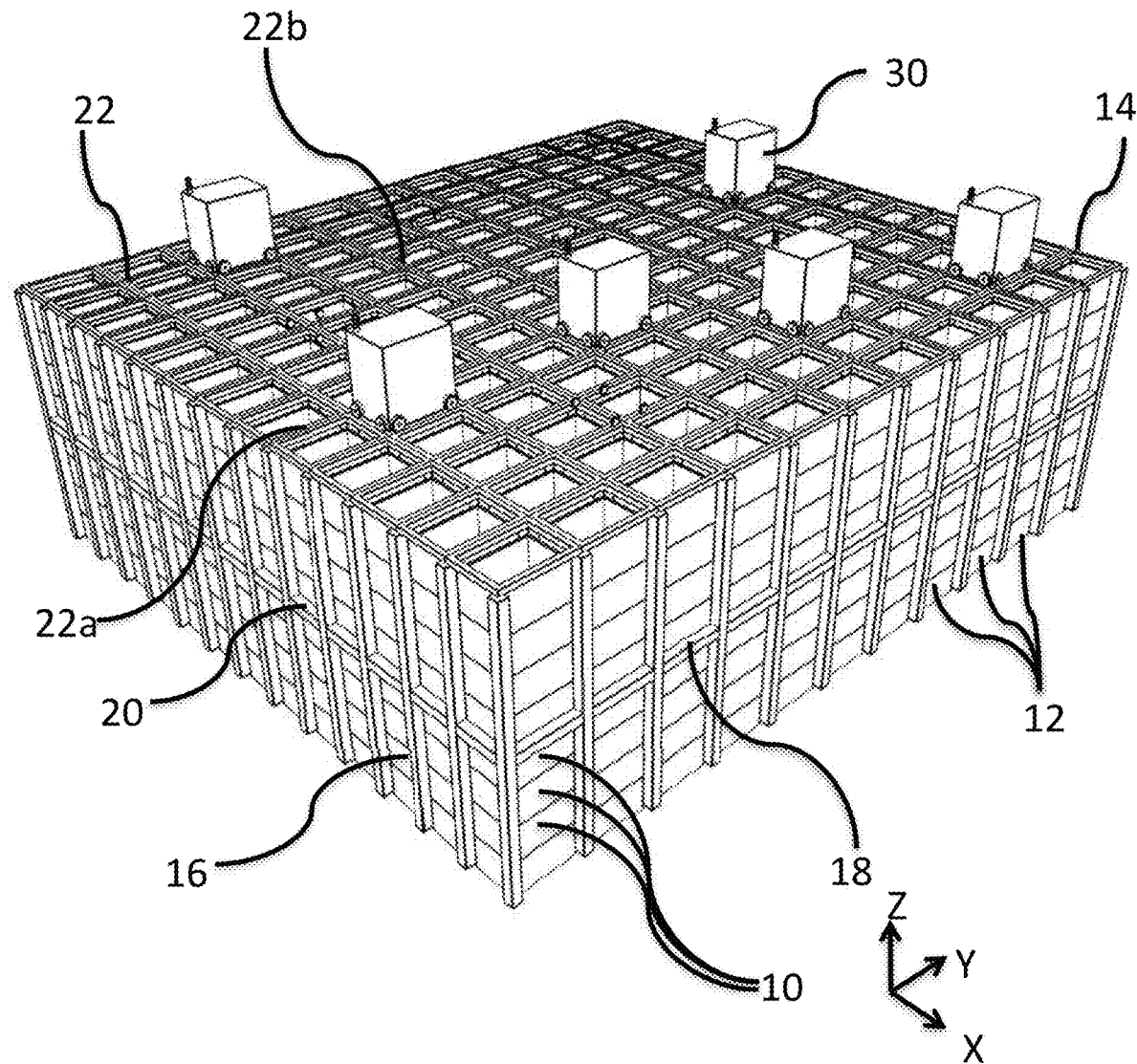
FIG. 4 is a schematic diagram of a system includes two specific locations, known as ports, at which bins can be transferred into or out of the known system.

FIG. 4 depicts an apparatus according to the first embodiment of the present invention. In this embodiment a control unit 100 according to a first embodiment of the present invention is provided. The control unit 100 is arranged to receive information from a first sensor 200 and, based on the received information, calculate a position of a transporting device 600. Moreover, the control unit 100 may control a transporting unit 600 based on the calculated position. The present inventors envisage that the control unit 100 may control more than one transporting device 600. For example, as shown in FIG. 3, each of the transporting devices shown may be controlled by the control unit 100.

Optionally, the control unit 100 may receive further information from a second sensor 300. Moreover, optionally, the control unit 100 may receive yet further information from a third sensor 400 and a fourth sensor 500. Each of the sensors is arranged to be mounted on the transporting device 600, for example, on a face and/or side of the transporting device 600 in such an orientation so as to capture and/or scan the environment in which the transporting device 600 is located.

The present inventors envisage a number of different types of sensors which may be used for the first to fourth sensors 200-500. In one example, the sensor is barcode scanner. The barcode scanner is arranged to scan a barcode placed in the environment of transporting device 600. Alternatively, the sensor may be a camera arranged to capture an image of the environment of the transporting device 600.

The control unit 100 according to the first embodiment of the present invention comprises a receiving unit 101 and a calculating unit 102.

The receiving unit 101 is arranged to receive information from at least one sensor, for example, from the first sensor 200. Optionally, the receiving unit 101 may further receive information from the second sensor 300. Moreover, the receiving unit 101 may further receive information from the third sensor 400 and the fourth sensor 500.

The calculating unit 102 is arranged to calculate a position of the transporting device 600 based on the received sensor information. In particular, the sensor information received by the receiving unit 101 is used to calculate the current and/or a future position of the transporting device 600.

Figure 5:
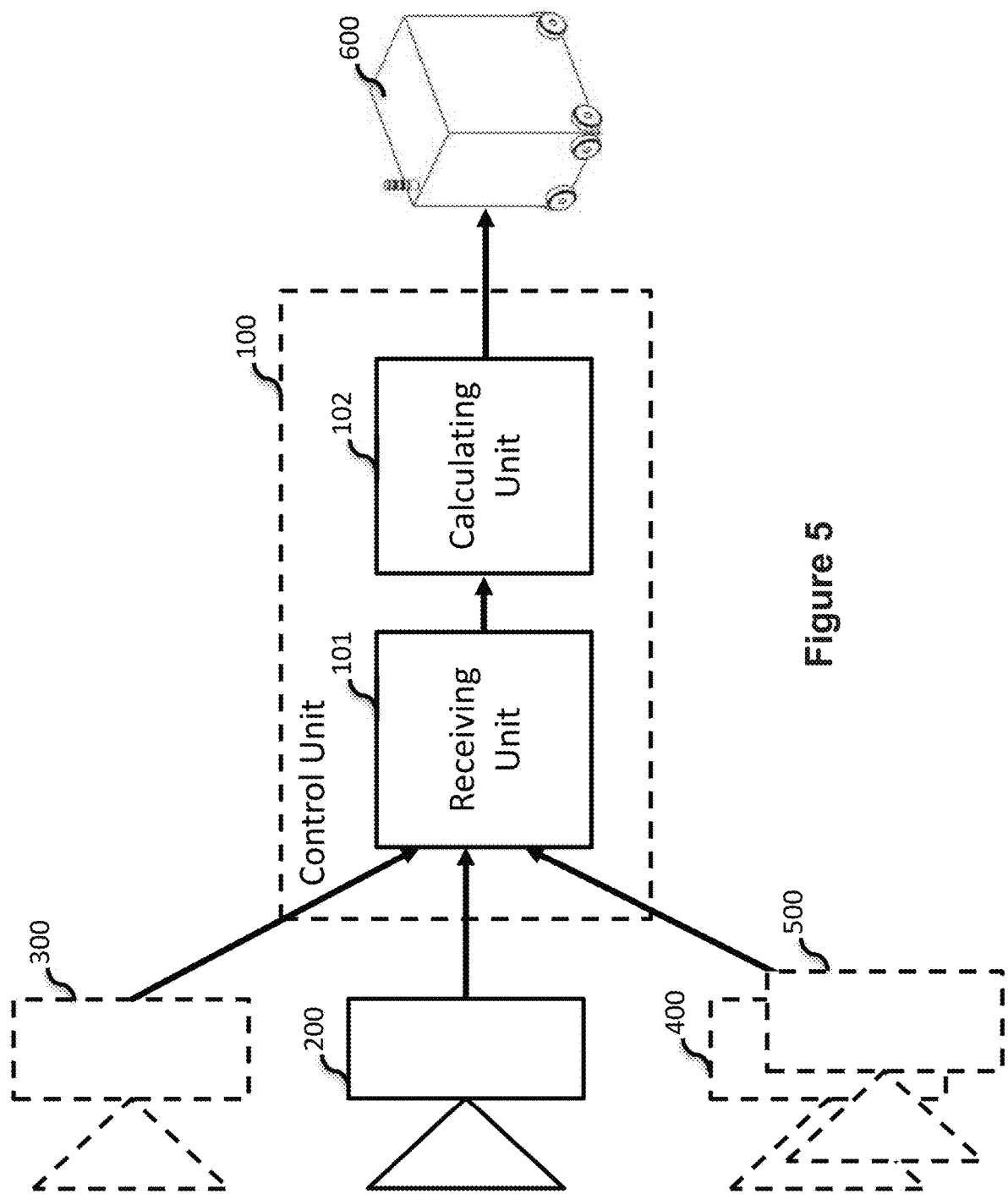
FIG. 5 is a schematic diagram of a control unit according to a first embodiment of the present invention.

FIG. 5 depicts a top down section view of a transporting device 600 and the placement thereon of first to fourth sensors 200-500. More specifically, the transporting device 600 comprises wheels 602 arranged around the outside of a cavity for receiving a container. The transporting device 600 also comprises a chassis 601 to which the wheels 602 are mounted (mounting not shown). As shown in FIG. 5, eight wheels are used by the transporting device 600 so as to move in a first direction (for example, an X-direction) across the rails or to move in a second direction (for example, a Y-direction) across the rails. As shown in FIG. 3, the use of transporting devices 600 on a grid means that placement of each transporting device 600 must be carefully controlled to avoid collisions with obstacles and to ensure accurate placement of the transporting device 600 above container locations in the grid. The present inventors have found that utilising a first sensor 200 mounted to a face/surface of the transporting device 600 allows a control unit 100 to accurately determine a position of the transporting device 600 on the grid.

As shown in FIG. 5, the first sensor 200 is mounted outside of a cavity of the transporting device 600 on an outside face of the transporting device in a location to scan/capture the environment of the transporting device 600. However, the first sensor 200 may instead be mounted, for example, on an inside face of the transporting device 600 such as inside the cavity space of the transporting device 600 in such a position to scan the environment (such as the rails). Alternatively, the first sensor 200 may be mounted on a top surface/face of the transporting device 600 to capture images of a ceiling/roof of environment of the transporting device 600. In this way, the first sensor 200 is arranged to capture an image/scan the environment of the transporting device 600. As depicted in FIG. 5 the area scanned/captured by the first sensor 200 is shown by reference sign 201. However, this is by way of example and the area scanned/captured may be varied in accordance with the particular environment of the transporting device 600.

Moreover, FIG. 5 shows the suggested placement of the second sensor 300 as being on an opposing face of the transporting device 600 to the first sensor 200. In the example of FIG. 5 the first sensor 200 is mounted on a face of the transporting device to scan/capture images of a first rail upon which the transporting device 600 is placed/moving whilst the second sensor 300 is mounted to capture/scan images of a second rail, parallel to the first rail. In this example, the first and second rails both extend in a first direction (for example, an X-direction). In the example, shown in FIG. 5 the first sensor 200 and second sensor 300 are arranged offset from one another in the first direction. In other words, the first sensor 200 and the second sensor 300 are arranged at different distances from one edge of the transporting device 600. However, this is provided by way of example only, and the first and second sensors 200 and 300 may be arranged not offset at the same distance from one edge of the transporting device 600.

FIG. 5 also shows third and fourth sensors 400 and 500 arranged on perpendicular faces to those upon which the first and second sensors 200 and 300 are mounted. In this way, the third and fourth sensors 400 and 500 are arranged to scan/capture images of the rail extending in a second direction (such as a Y-direction) along which the transporting device 600 is placed/moving. Similar to the first and second sensors 200 and 300 the third and fourth sensors 400 and 500 may be mounted outside or inside the cavity of the transporting device 600 or on a top face of the transporting device 600 so as to capture information about the environment of the transporting device 600 relative to a third rail and a fourth rail. The third and fourth rails are perpendicular to the first and second rails, with the third rail being parallel to the fourth rail.

Figure 6:
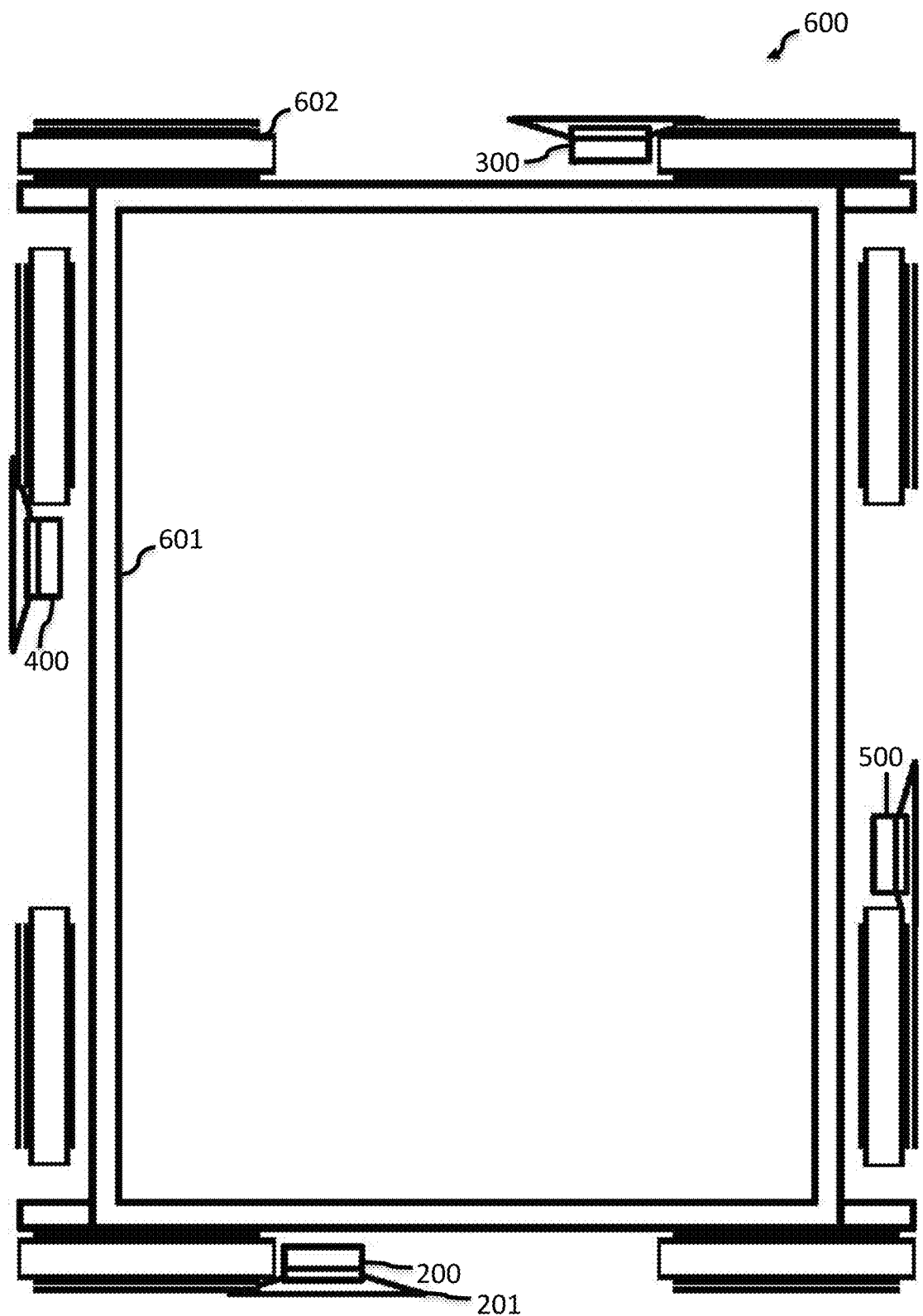
FIG. 6 is a schematic diagram of a top down view of a transporting device showing an example mounting of a plurality of sensors.

FIG. 6 shows a side view of a transporting device 600 comprising wheels 601 mounted to a chassis 602. The wheels 601 are supported on a grid 701 which comprises a first set of parallel rails extending in a first direction and a second set of parallel rails extending in a second direction. The transporting device 600 is, at a given moment, supported by at least two parallel rails. In this way, the transporting device 600 is able to move in either a first direction or a second direction by way of wheels 602 mounted to chassis 601. In this example, the first sensor 200 scans/captures an image of an area of the grid labelled 702. In this example, the region 702 is a region on the rail next to a track upon which the wheels 601 are supported. An area being scanned/captured is shown with reference sign 201. As explained previously, the location, mounting and area scanned by the first sensor 200 are shown by way of example only and other locations and area scanned are envisaged by the present inventors, such as scanning a ceiling/roof under which the transporting device is operating.

FIGS. 7 to 11 as will be described in the following paragraphs relate to a first example where the first sensor 200 is envisaged to be a barcode scanner arranged to scan at least one barcode. In this example, the at least one barcode will be mounted on the grid 701, however, other locations of mounting are envisaged, such as a roof/ceiling. Based on the example of at least one barcode mounted to the grid 701 the first sensor 200 has a corresponding mounting of being mounted to an outside face of the transporting device 600 such that the first sensor 200 can scan the at least one barcode on the grid 701. However, other mounting locations are envisaged, such as on the inside of the cavity of the transporting device 600. As will be appreciated, the control unit 100 of the first embodiment is arranged to control the transporting device 600 based on the information received by the first sensor 200 which comprises a barcode scanner.

Figure 7:
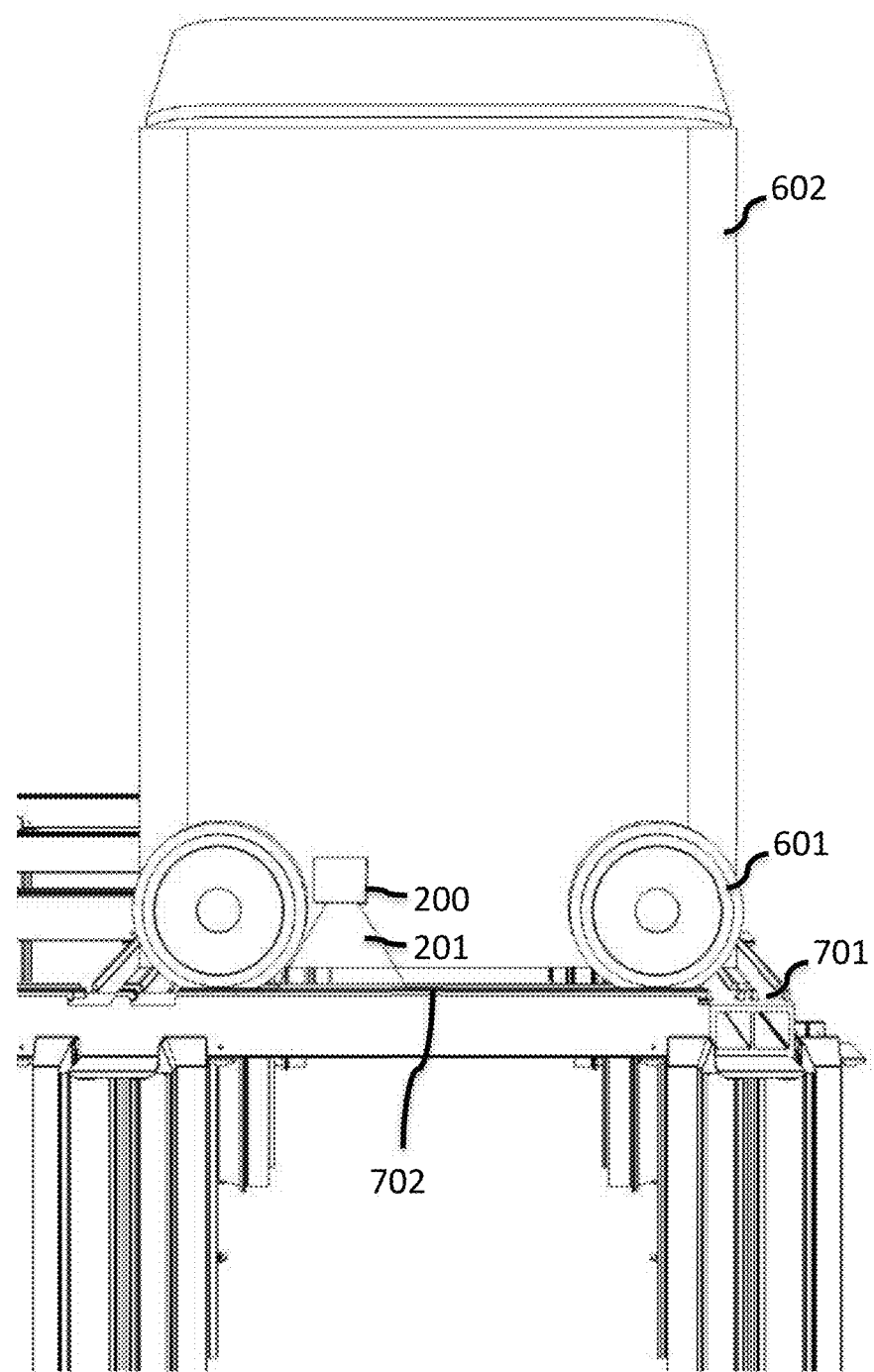
FIG. 7 is a schematic diagram of a side view of a transporting device showing an example of the environment scanned/captured by at least one sensor.
Figure 8:
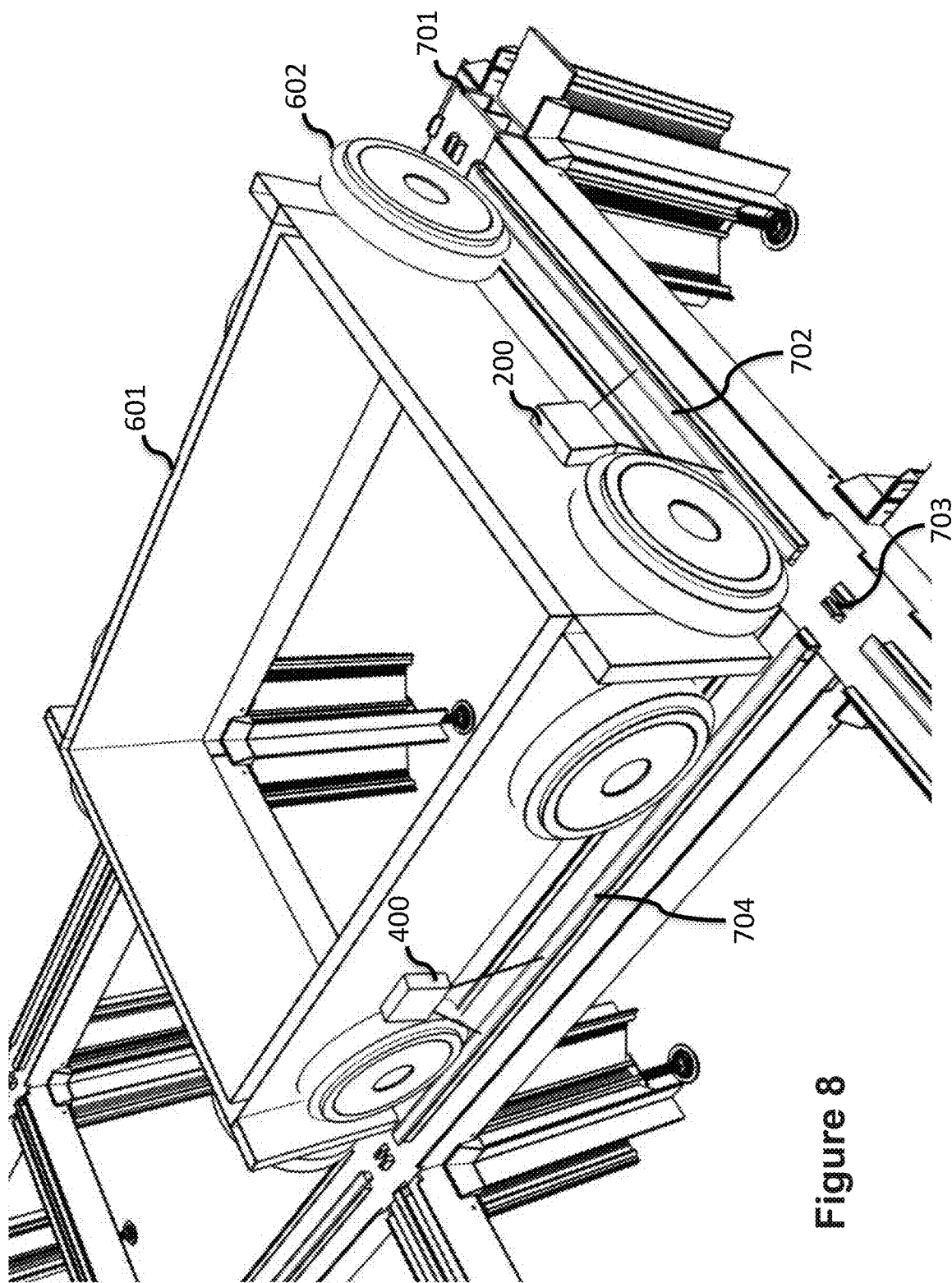
FIG. 8 is a schematic diagram of a transporting device showing an example of the environment scanned/captured by at least one sensor, where the sensors are barcode scanners.

FIG. 7 shows a first example of control performed by the control unit 100 according to the first embodiment of the present invention. FIG. 8 shows the first example of FIG. 7 without the chassis 601 and wheels 602 to thereby provide a clear view of the first sensor 200 and the third sensor 400. In the example shown in FIGS. 7 and 8 the first sensor 200 is a barcode scanner which is arranged to scan at least one barcode 702 mounted on the grid 701. In this example, the present inventors envisage that each cell of the grid 701, i.e. each location from which the transporting device 600 can add/remove a container, is marked by way of at least one barcode which the sensor 200 is able to scan. In one example, each grid cell is provided with a number (in the form of a barcode) making it uniquely numbered. In this example, a first sensor 200 provided on the transporting device 600 is sufficient to identify precisely the location of the transporting device 600 because each grid cell is uniquely barcoded. Optionally, further barcodes may be provided for each grid cell for at least two reasons, firstly to ensure that the first sensor 200 receives a valid read of at least one barcode of the grid cell, by providing more than one opportunity to scan a barcode of a grid cell. Secondly, to provide a higher positional reporting frequency, in other words, to provide more frequently the location of the transporting device 600 on a grid. For example, by interleaving the reading from two sensors, the period of position reporting can be reduced so that more up to date information of the position of the transporting device can be achieved.

Optionally, a second sensor 300 (not shown) may be provided on an opposing face of the transporting device 600 and arranged to scan a corresponding barcode on a rail parallel to the rail being scanned by the first sensor 200. In this way, further redundancy is provided to ensure that the first sensor 200 and second sensor 300 obtain a valid read of at least one barcode. Moreover, the intersection 703 of perpendicular rails provide an area of rails in which it is not possible to provide a barcode due to limited space. Therefore, the present inventors have found that providing a first sensor 200 and second sensor 300 offset from each other in a first direction along the face of the transporting device 600 ensures that a valid read from at least one of the first or second sensors allows for the determination of the position of the transporting device 600 in all situations.

Optionally, a third sensor 400 and a fourth sensor 500 may be provided on faces of the transporting device which are perpendicular to the faces upon which the first sensor 200 and the second sensor 300 are mounted. The third sensor 400 and the fourth sensor 500 are arranged to scan barcodes mounted on rails extending in a second direction 704. Similar to the first and second sensors, when each grid cell is uniquely identified by at least one barcode, the use of third and fourth sensors provide redundancy to ensure that a valid read of at least one barcode corresponding to the cell is obtained by comparing the scanned barcodes to ensure they match.

Moreover, by placing the barcodes in a predetermined pattern across the grid 701 may allow the control unit 100 to determine the position of a transporting device without relying on a map of the location of each barcode. For example, if a grid is less than 10 cells in a first direction then, because each barcode corresponds with a number (for example, a number with two significant figures), the least significant digit of the number to which the barcode corresponds could be indicative of the number of cells in a first direction at which the transporting device is located. On the other hand, a most significant digit could be indicative of the number of cells in a second direction at which the transporting device is located. Therefore a grid up to 9×9 cells could be accommodated by such a method.

Alternatively, all of the grid cells in a first direction may be commonly numbered and similarly the grid cells in a second direction may be commonly numbered thereby forming columns and rows. Thereby the number of cells in a first direction from an origin and the number of cells in a second direction from an origin can be indicated as references to a column and row of cells. Therefore, by employing two sensors (such as the first sensor 200 and the third sensor 400) on the transporting device on perpendicular faces of the transporting device the following can be calculated by the control unit 100 (where the size of a grid cell is known):

absolute distance along the X axis (the first direction) in mm whilst driving along the X axis, or;
absolute distance along the Y axis (the second direction) in mm whilst driving along the Y axis, or;
absolute (X, Y) position in (mm, mm) whilst parked.

On the other hand with one sensor on each side of the bot (the first to fourth sensors, 4 total, on different faces of the transporting device) the following can be calculated by the control unit:

absolute distance along the X axis in mm and Y axis cell ordinate whilst driving along the X axis, or;
absolute distance along the Y axis in mm and X axis cell ordinate whilst driving along the X axis, or;
absolute (X, Y) position in (mm, mm) whilst parked.

The dual sensor measured positions are actually of the form (cells, mm) or (mm, cells), but since the transporting device drives in straight lines, this is actually the same as a (mm, mm) reading, and hence a full absolute position.

In this example, all of the first to fourth sensors are envisaged to be barcode scanners and arranged to scan at least one barcode mounted on the grid 702.

Figure 9:
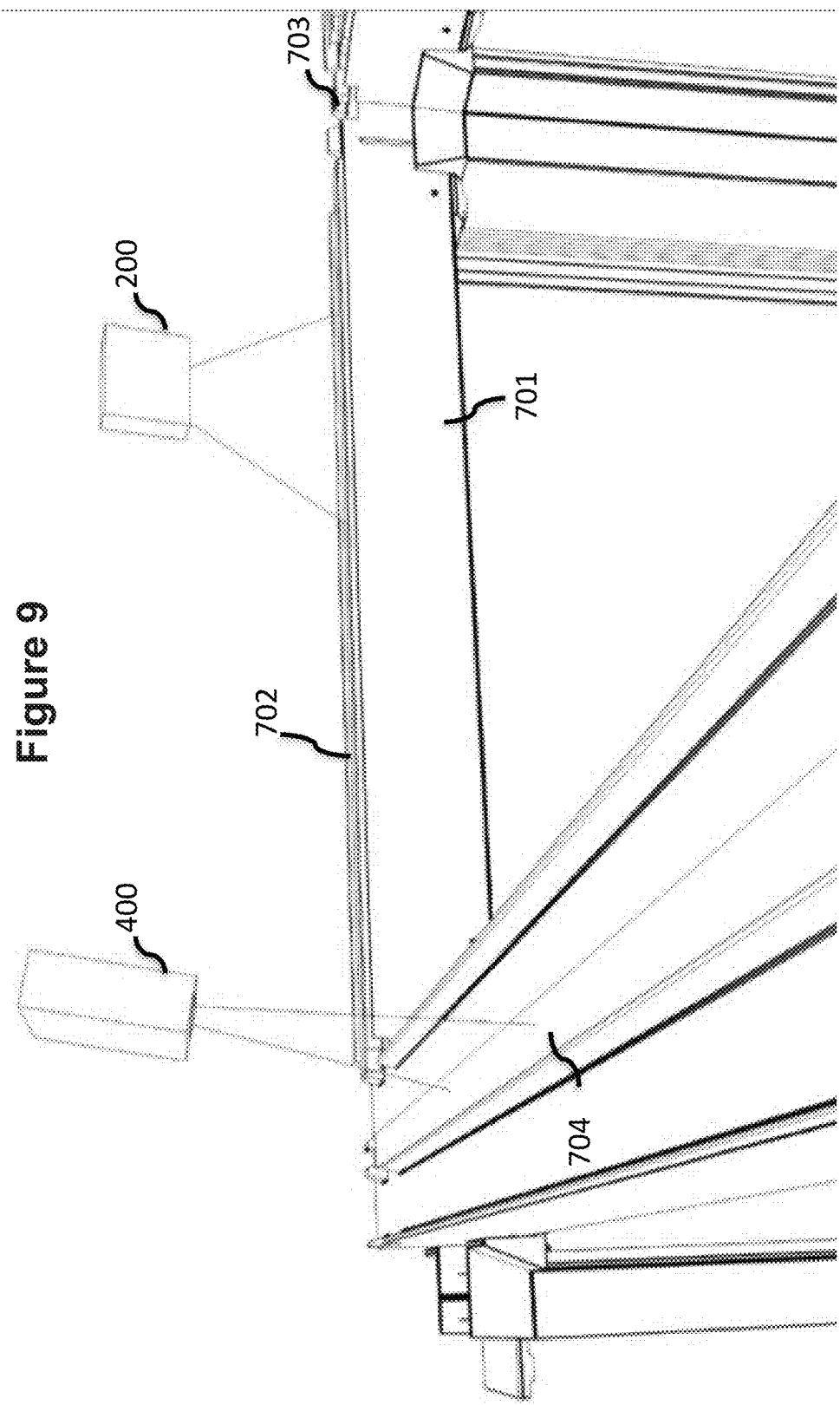
FIG. 9 is a schematic diagram of a barcode scanner showing an example area scanned by the barcode scanner.

FIG. 9 shows an example of a barcode 1001 which may be provided on a cell of a grid 701. As explained, a barcode corresponds to a number. To aid in installation of the barcode 1001 on the grid a digit representation of the barcode 1002 or other indicator may be provided. In this way, the installer of barcodes may be instructed to install the barcodes such that the digit representation is on one side of the cells across the grid. In this way, accurate installation of the barcodes can be ensured.

Figure 11A:
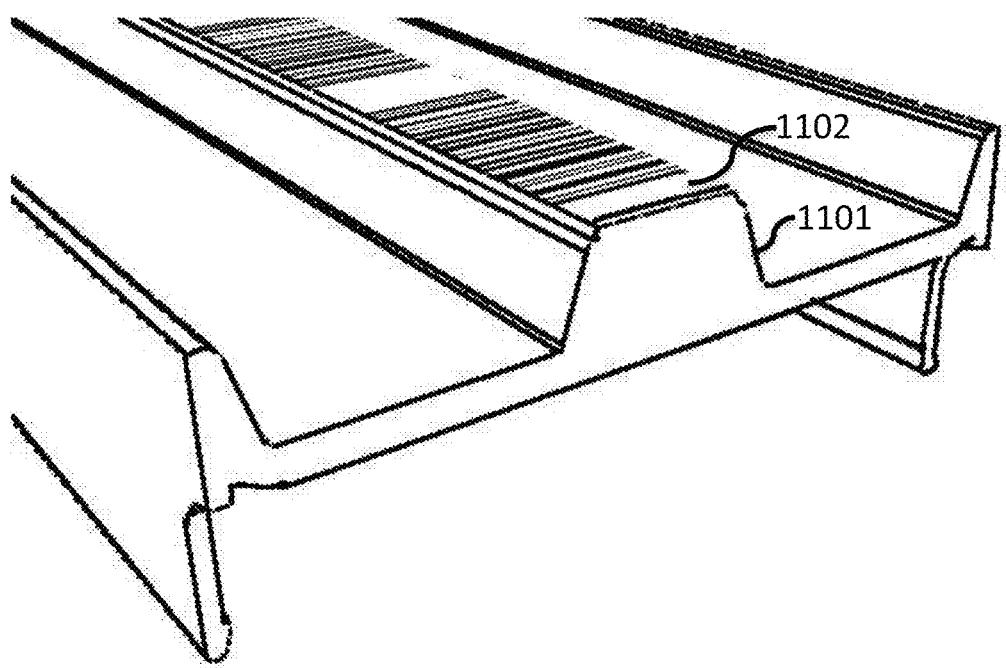
FIGS. 11a and 11b show example cross sections of the rails and the placement of barcodes thereon.
Figure 11B:
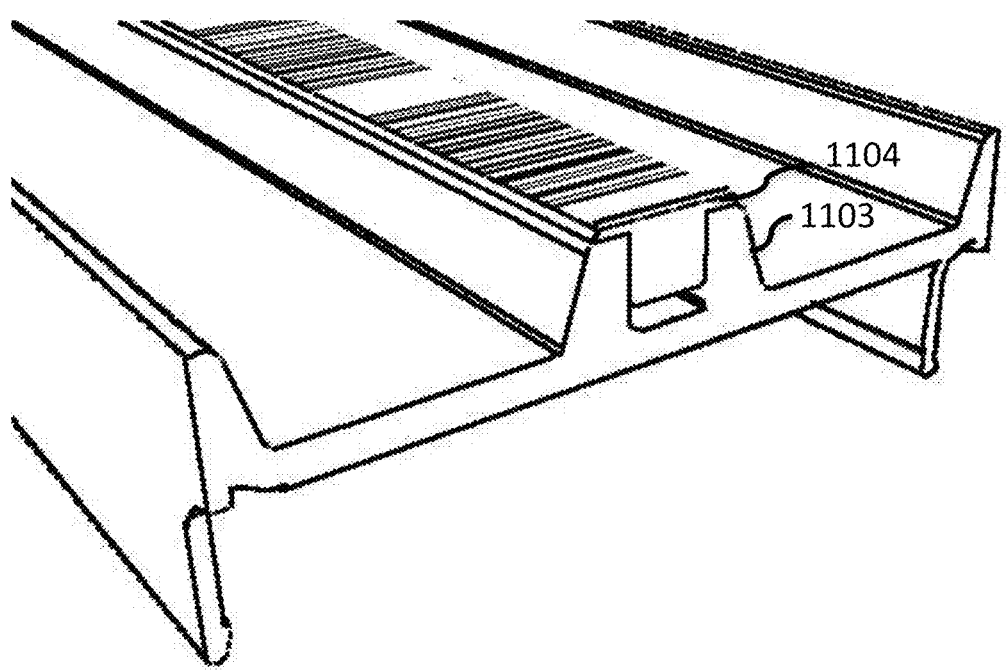

FIGS. 11a and 11b show two methods by which the present inventors envisage the barcodes being integrated into the grid 701. In FIG. 11a, the grid 701 is envisaged to have a flat centre area 1101 provided between the two tracks upon which transporting devices 600 operate. Upon this flat centre area 1101 an adhesive strip 1102 is envisaged to be affixed. The adhesive strip 1102 has been formed (such as by laser printing) with at least one barcode being printed thereon.

Alternatively, as shown in FIG. 11b, the grid is envisaged to be formed with a depression in the region between the tracks upon which the transporting devices 600 operate. The depression 1103 is formed to accept a T-shaped insert 1104. The T-shaped insert 1104 may be formed by injection moulding plastic, with barcodes printed thereon. The insert 1104 may be installed once the grid 701 has been installed and allows simple installation of the barcodes in the correct sequence, location and orientation. Thereby, the insert 1104 can be clipped securely in place. By using an insert 1104 the present inventors identified the following benefits: printing is mechanical and more precise than human application of an adhesive strip, the shape of the insert 1104 can force accurate alignment with the grid, shape can be non-rotationally symmetric to force correct orientation at install, avoids loss of precision due to tension in adhesive strip stretching it during application, material can be hardwearing and match the properties of the running track for example, glass fibre reinforced nylon has almost identical thermal expansion coefficients to aluminium from which the grid is formed.

As an alternative to both of these solutions, the present inventors envisaged a transporting device 600 fitted with a laser printer to thereby print barcodes on the top surface of the grid once it's been installed. This would help with install time and accuracy.

Figure 10:
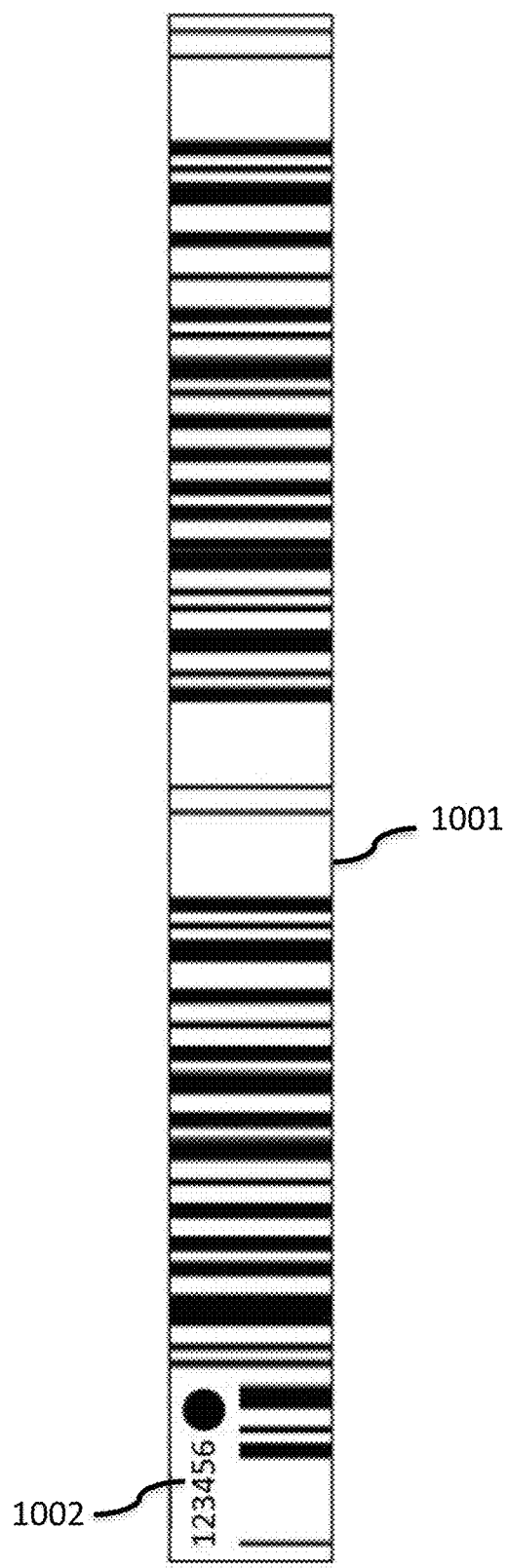
FIG. 10 is an example section of barcode to be scanned by a barcode scanner.

FIG. 10 shows an example of a predetermined pattern 1201 for laying out barcodes across a grid. As mentioned previously, a 9×9 grid can be accommodated with barcodes which indicate numbers with two significant digits. However, the present inventors envisage larger sized grids. Therefore, other methods of laying the barcodes across the grid to ensure each grid cell is uniquely identified have been considered by the present inventors. In FIG. 10 barcodes strips are used which extend from 0 to 3430. Therefore, multiple strips of barcodes may be applied to the grid, where each strip extends from 0 to 3430. The cells shown in FIG. 10 correspond with grid cells of the grid 701. An origin of the grid 701 is indicated by reference sign 1202. The dotted lines indicate where the barcodes are reset to 0 i.e. where a new strip of barcodes is started. The numbers shown in FIG. 10 indicate the barcode numbers placed on a rail in each grid cell.

Although FIG. 10 shows barcode strips being applied in a first direction (for example, an X-direction) the same method may be used to apply strips to the second direction (for example, a Y-direction).

As shown in FIG. 10, one cell may comprise barcodes ranging from 0 to 686, which as discussed previously provides redundancy should a barcode reader be unable to read one barcode, instead, further opportunities for reading barcodes are provided to ensure accurate positioning is achieved. Moreover, it provides finer resolution of the location of a transporting device 600 within a grid cell. The value of scanned barcode increases from one side to another side of the cell across the grid.

The present inventors have found that the number of grid cells that can be uniquely identified by the barcode strips can be increased by, for each other row of the grid, the barcode strip is offset in a first direction by the number of rows away from the origin it sits on the other axis.

In this way, a transporting device with both a first sensor 200 and a second sensor 300 can take position reading from opposing sides of the transporting device 600. As a result of the layout, one reading will always be lower than the other. The number of complete cells it is offset by, combined with the knowledge of whether the lower reading is from one side of the transporting device or the other side, gives a coordinate position on the opposite axis. The offsets increase by 2 cells at a time so as to reduce the sensitivity to the case where the bot is crossing an intersection and taking its left and right readings from consecutive cells. Thereby no grid map is required with the absolute position being calculated by the control unit 100 based on a pure mathematical function of the sensor inputs. This substantially reduces software complexity and removes the need for extra storage hardware which would increase cost.

Thereby, each grid cell need not be individually numbered by a barcode. Instead, two barcodes, on opposite sides of a transporting device may be used to provide a unique position on the grid of the transporting device in a first direction. As will be appreciated, such a layout may be applied in a second direction to also provide a unique position on the grid of the transporting device in the second direction.

FIG. 11 shows an example top-down view of the mounting of a first sensor 200 and a second sensor 300 by way of a frame f (which corresponds, in a simplified manner, with the chassis 601). The area scanned by the first sensor 200 is shown by reference sign 201, whilst the area scanned by the second sensor 300 is shown by reference sign 301. As will be appreciated, the barcode strip scanned by the first sensor 200 will be mounted on a first rail extending in a first direction whilst the barcode strip scanned by the second sensor 300 will be mounted on a second rail, parallel the first rail, extending in a first direction. The barcode strips are spaced apart by a distance d. Each of the first and second rails are arranged to support and provide tracks for a transporting device 600 to traverse the grid in a first direction. As shown in FIG. 11 each of the sensors is offset from each other in a first direction by an amount m. As described previously, m may equal zero and hence no offset may be present. However, advantageously, by providing a distance m between the sensors ensures that a valid read of barcodes on either side of an intersection of rails (at which no barcodes are provided) ensures that absolute positional information is always available to the control unit 100. In particular, the distance m is set such that one of the first sensor 200 or the second sensor 300 is capable of reading a barcode on either side of the intersection in the grid.

Moreover, the present inventors have found a further advantage of providing two sensors on opposing faces of the transporting device 600 (with or without an offset). In particular, by comparing the absolute position determined by the separate sensors (i.e. by the comparing the absolute position of the first sensor 200 with the absolute positon of the second sensor 300) an orientation of the transporting device 600 on the rail can be found. In particular, a rotation of the transporting device 600 can be determined (for example, as shown by symbol θ). When an offset of the sensors in their mounting is applied then the known offset will need to be taken into account when calculating the actual rotation of the transporting device. In other words, the present inventors have found that by determining, independently, the absolute position of each sensor then, by trigonometry, the rotation of the transporting device can be calculated which may be used to steer the transporting device and prevent derailments of the transporting device from the grid.

Figure 13:
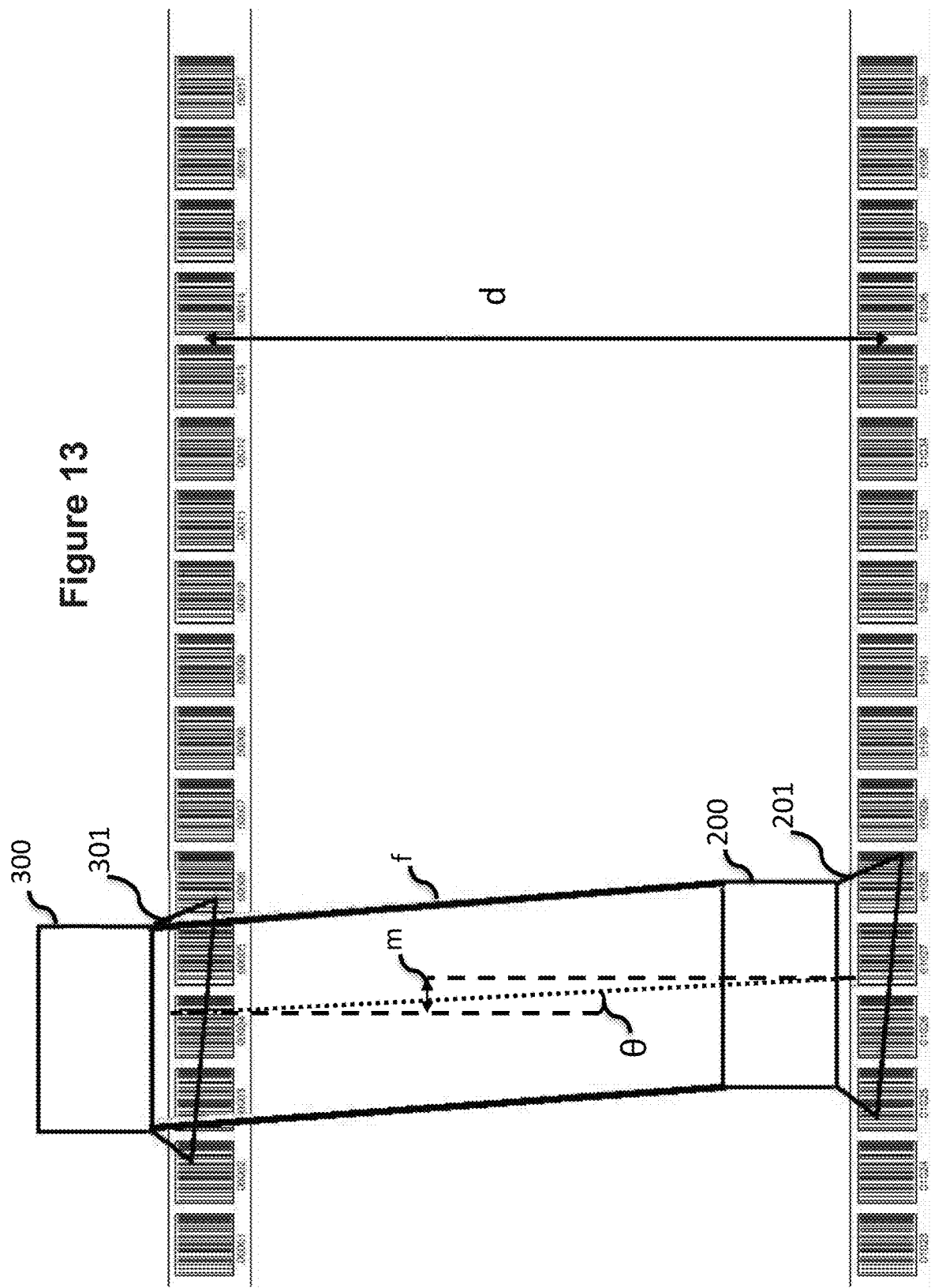
FIG. 13 is a schematic diagram two barcode scanners showing their relative positioning according to one example of the first embodiment.

With regard to FIGS. 12 and 13 a second example of sensor is shown. In particular, the sensors employed in FIGS. 12 and 13 are cameras arranged to capture an image of the environment FIGS. 12 and 13 as will be described in the following paragraphs relate to a second example where the first sensor 200 is envisaged to be a camera arranged to capture an image of the environment in which the transporting device is placed. The first sensor 200 is shown mounted to an outside face of the transporting device 600 such that the first sensor 200 can capture an image of the grid 701. However, other mounting locations are envisaged, such as on the inside of the cavity of the transporting device 600 or on the top of a transporting device to capture and image of a ceiling/roof under which the transporting device 600 is operating. As will be appreciated, the control unit 100 of the first embodiment is arranged to control the transporting device 600 based on the information received by the first sensor 200 which comprises a camera.

FIGS. 12 and 13 are generally identical to FIGS. 7 and 8, except that first sensor 200 and the fourth sensors 400 are envisaged to be camera. Moreover, region 702 on the rails between the tracks need not be provided with a barcode, like in FIGS. 7 and 8. Instead, the region may be left bare. For example, if the rail is formed of extruded aluminium then the region 702 will be same extruded aluminium as the rest of the rail without the need for a coating, which reduces complexity.

Therefore, the following describes how the control unit 100 calculates a position of the transporting device 600 based on the images captured by the first sensor 200. In one example, the first sensor 200 is arranged to capture images of the grid a predetermined time apart for example, capturing images every 1 ms. Based on two captured images from the first sensor 200 the control unit 100 is arranged to calculate a distance moved in the time between capturing the images. This may be achieved by comparing surface imperfections of the grid between the captured images. For example, the camera may be employed by way of an optical sensor from an optical mouse typically used for controlling a cursor on a computer. The optical mouse may employ a light source, such as an LED or a Laser, to illuminate a surface and detect surface properties, such as imperfections, using a camera/optical sensor. To achieve this, images of the surface are captured at a predetermined interval, such as one image every 1 ms. Imperfections are identified in the captured images and the distance each imperfection moves between the images are used to calculate a distance the optical mouse has moved in the interval. With regard to the first sensor 200 comprising a camera, with a camera of known resolution then the number of pixels moved by the imperfections in the images can be used, together with knowledge of the mounting location of the first sensor 200, to calculate a distance moved in the time between taking images. Accordingly, using dead reckoning the distance moved by the transporting device in a first direction (such as an X-direction) may be calculated. By employing a third sensor 400 on a face perpendicular to the first sensor 200 then a distance moved in a second direction (such as a Y-direction) can be calculated to thereby calculate the distance travelled and thereby determine an absolute positon of the transporting device on the grid.

Moreover, by using a first sensor 200 and a second sensor 300 on opposing faces of the transporting device 600 then respective distances on either side of the transporting device 600 may be calculated to thereby determine any rotation of the transporting device such as where one side of the transporting device 600 moves a further distance than the other side. Based on the calculated rotation, the transporting device 600 can be commanded to steer to correct the error in rotation. Moreover, by calculating a distance moved by each side of the transporting device 600, accuracy of the determined distance moved by the transporting device 600 can be increased by, for example, averaging the distance calculated by each sensor detecting the distance moved.

Moreover, the present inventors envisage including on the grid markings and/or colourings that may be detected by the first sensor 200. In this way, based on a grid map of the location of the markings and/or colourings an absolute position of the transporting device 600 can be calculated by the control unit 100. For example, a coloured marking could be provided on a certain grid cell to thereby indicate, based on a grid map locating that colouring at a particular grid cell, the absolute position of the transporting device 600. Moreover, once the absolute position of a transporting device 600 is located then the dead reckoned position calculated based on relative movements of the transporting device 600 may be updated based on the knowledge of the absolute position of the transporting device 600. In another example, a QR code may be used and read by the first sensor 200 to determine the absolute position of the transporting device. This is particularly advantageous because absolute positioning ensures that no accumulated error develops because dead reckoning is not used. In particular, for larger grids, the dead reckoning error increases quickly because calibration of a dead reckoned sensor may only occur after the traversal of large distance. Therefore, the use of absolute position on larger grids is particularly advantageous.

Optionally, the first sensor 200 and/or second sensor 300 may be provided in conjunction with a rangefinder such as a time of flight sensor. The rangefinder may be positioned so as to determine the distance between the rangefinder and the grid. In this way, by arranging the rangefinder in conjunction with the first sensor 200 and/or second sensor 300 then the distance between the first sensor 200 and/or second sensor 300 and the grid can be accurately determined. Using the distance information the calibration of the first sensor 200 and/or second sensor 300 may be performed. For example, for accurate sensing of the distance moved by the transporting device, it is preferable to know how many pixels are moved per unit distance i.e. when comparing two images taken a fixed time apart by the first sensor 200 and tracking a particular surface imperfection then the number of pixels moved by the surface imperfection between the two images must be corresponded with a distance moved by the transporting device. In this way, the detected pixel movement as detected by each of the first and second sensors can be converted into a distance measurement. By measuring the distance between the first/second sensor and the grid by use of the rangefinder then this pixel/distance calibration value can be determined.

As described above, the first sensor 100 and/or the second sensor 200 may be used to calculate a distance traversed by a transporting device. In particular, the distance traversed is typically calculated in the direction in which the transporting device has been commanded to move. For example, if the transporting device has been commanded to move in an X-direction then the distance measured by the first sensor/second sensor is the distance moved by the transporting device in the X-direction. However, movement in other axes may be advantageous. For example, measuring the distance moved in a Y-direction, perpendicular to an X-direction, when the transporting device has been commanded to move in an X-direction may be useful. For example, by measuring the distance moved in the Y-direction, faults in the transporting device may be revealed such as malfunctioning wheels causing a wobble in the Y-direction.

Moreover, the first sensor/second sensor may be used to detect anomalies in the grid by measuring the size of surface imperfections and determining an anomaly in the grid when the size of a surface imperfection is greater than a threshold.

Figure 14:
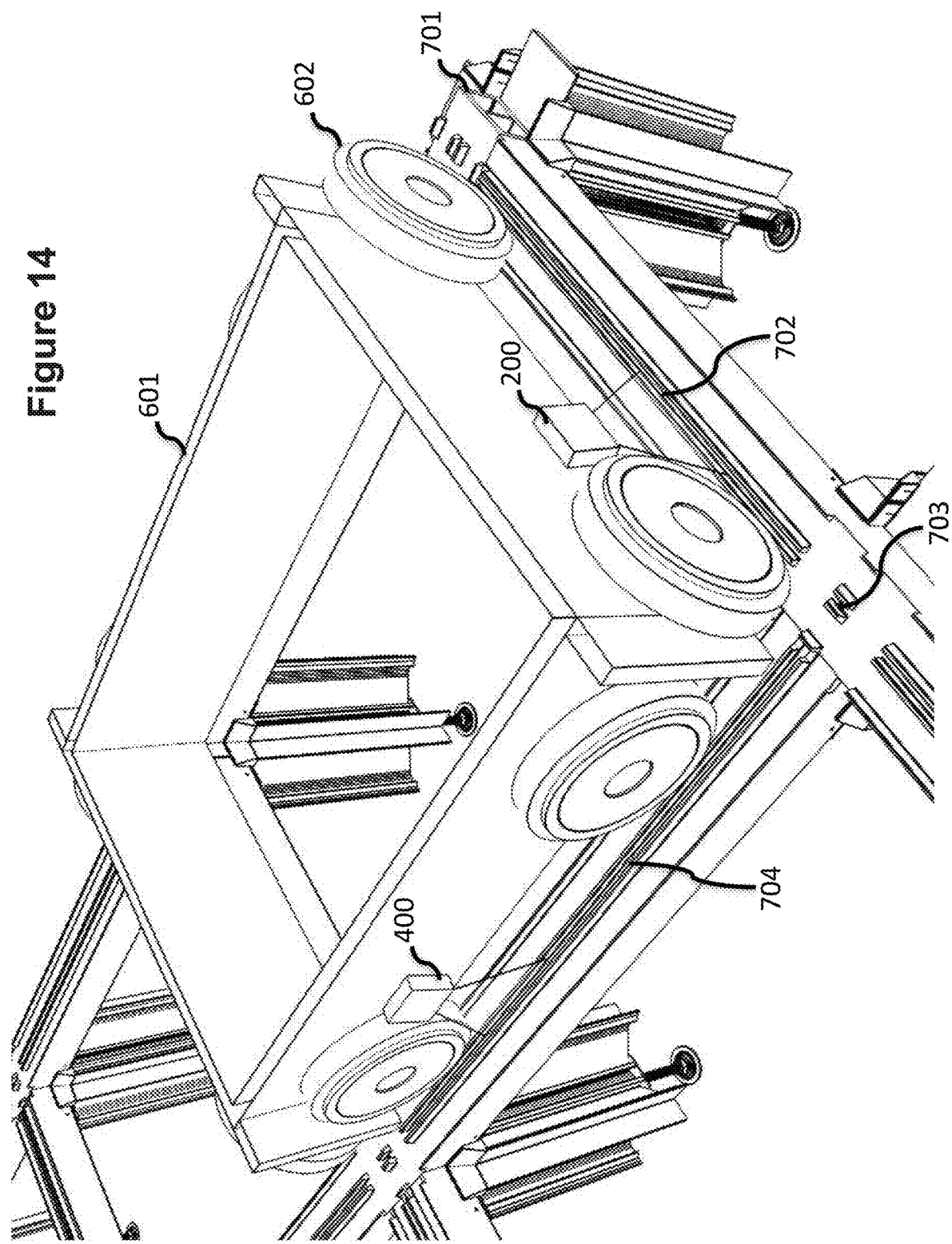
FIG. 14 is a schematic diagram of a transporting device showing an example of the environment scanned/captured by at least one sensor, where the sensors are cameras.
Figure 15:
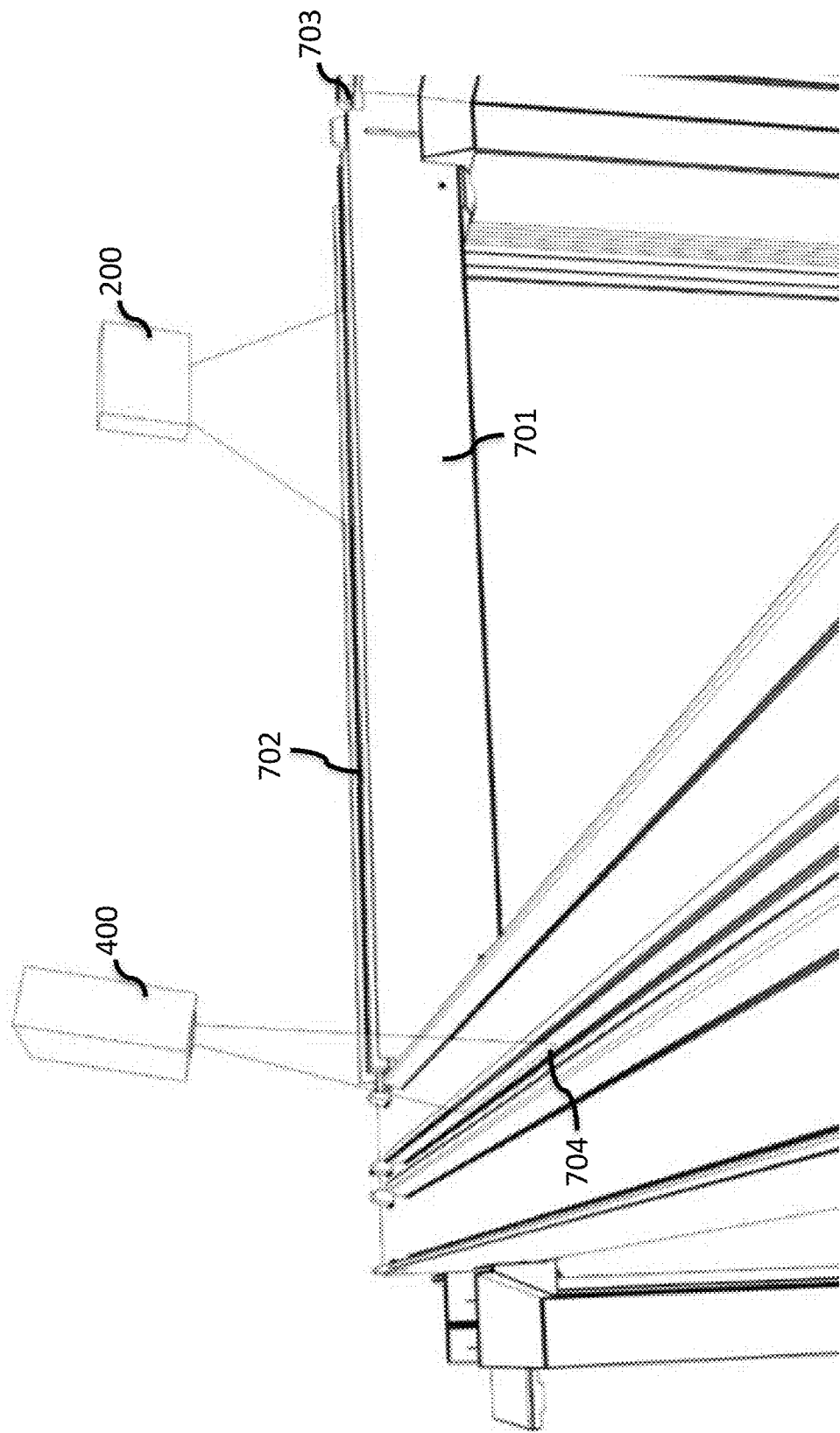
FIG. 15 is a schematic diagram of a camera showing an example area captured by the camera.
Figure 16:
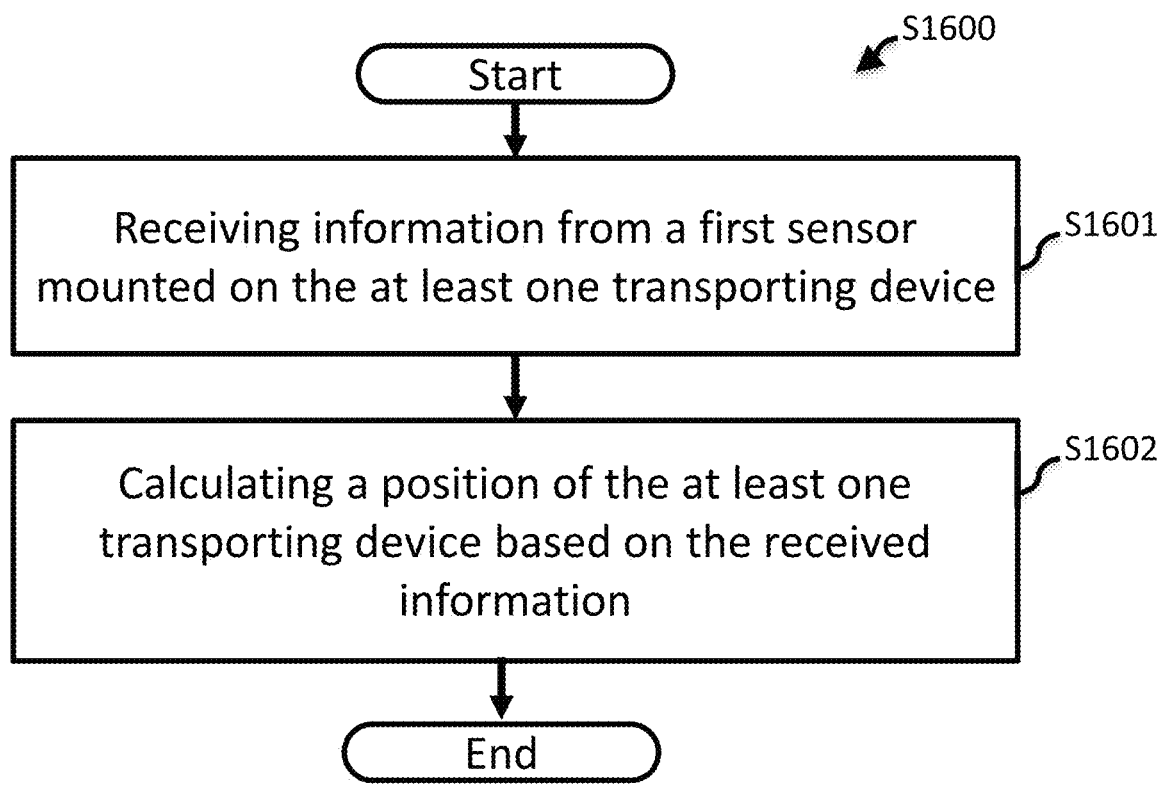
FIG. 16 is a flowchart of method steps performed by the control unit according to the first embodiment.

FIG. 14 is a flowchart of method steps to be performed by a method of controlling a transporting device according to a first embodiment of the present invention. The method S1600 controls a transporting device based on sensor information.

Method S1600 starts at step S1601 which comprises receiving information from a first sensor mounted on the at least one transporting device. The sensors is envisaged by the present inventors to be a barcode scanner or a camera. In both cases, the first sensor scans/captures information about the environment in which the transporting device is located.

At step S1602 the method calculates a position of the at least one transporting device based on the received information. In this way, the location of the transporting device on the grid can be determined with increased accuracy.

Although the above described method relates to a first sensor, the present inventors envisage that the transporting device may comprise further sensors, such as a second, third and fourth sensor. Each sensor is arranged to be mounted on the transporting device in a different location. For example, the first and second sensors may be mounted on opposing faces of the transporting device. The third and fourth sensors may also be mounted on opposing faces of the transporting device, the opposing faces may be perpendicular to the faces upon which the first and second sensors are mounted. In this way, each of the sensors detects different parts of the environment in which the transporting device is operating. Multiple sensors are advantageous because they provide redundancy on the transporting device in that if one sensor fails to capture appropriate information from the environment then one of the other sensors may be more successful. Moreover, in positions where one sensor is unable to scan/capture the environment (such as over rail intersections) then another sensor may be able to scan/capture the environment more successfully. In addition, with multiple sensors other measurements may be taken such as determining a rotational orientation of the transporting device by comparing positional measurements from one sensor to the same positional measurement on a sensor mounted on an opposing face of the transporting device to determine an angle between the sensors.

The present inventors envisage that when the first sensor is a barcode scanner at least one barcode is scanned which is indicative of the location of the transporting device. For example, the grid upon which the transporting device operates may comprise a barcode for each grid cell in which a container may be remove/placed. Therefore, by reading the barcode associated with the grid cell then the absolute position of the transporting device may be calculated by the calculating step S1602. However, some grids may have a number of grid cells greater than the number of barcodes available. Therefore, the present inventors have considered other absolute positioning techniques with a second sensor scanning a second barcode. The first and second barcode information is received by the receiving step S1601 and used by the calculating step S1602, using knowledge of how barcodes may be laid out on a grid (such as a mathematical relationship), to calculate the absolute position of the transporting device. Such a procedure may be performed in a second direction to thereby determine the position of the transporting device in the second direction. Moreover, by including more than one barcode per grid cell then greater resolution in the position of the transporting device over a grid cell may be resolved.

The present inventors also envisage that the first sensor is a camera. In this example, the camera captures an image of the environment of the transporting device. The camera captures at least two images of the environment of the transporting device in a given interval. The receiving step S1601 receives this information. The calculating step S1602 uses the received images to calculate a distance travelled between capturing the images. To achieve this, the calculating step S1602 may compare the captured images and, based on surface imperfections, count the number of pixels travelled between the captured of the images. Based on knowledge of the resolution of the camera, the mounting of the camera and the time interval between captures, the calculating step S1602 may calculate the distance travelled. Accordingly, based on a dead reckoning scheme the distance travelled by the transporting device from an origin can be calculated. Thereby, an absolute position of the transporting device can be calculated. Moreover, by using two cameras mounted on perpendicular faces of the transporting device, then the same determination can be made in a second direction. In this way, a coordinate position in two dimensions can be calculated. In addition, using two cameras mounted on opposing faces of the transporting device, then the distance each respective side of the transporting device moves can be calculated to thereby determine a rotation of the transporting device. The method S1600 may then command the transporting device to steer, based on the determined rotation, to correct the rotation and to prevent a derailment of the transporting device.

Modifications and Variations

Many modifications and variations can be made to the embodiments described above, without departing from the scope of the present invention.

Figure 17A:
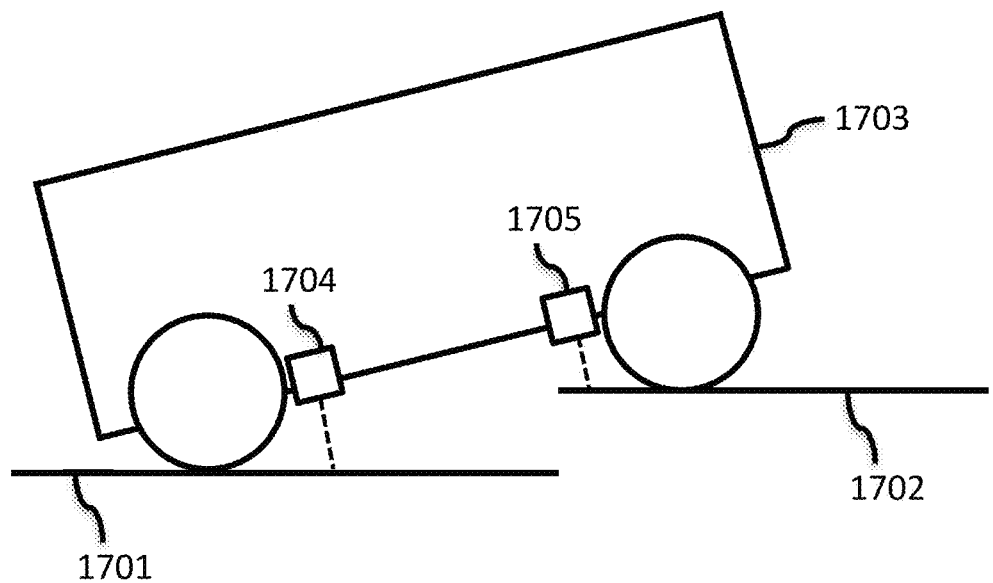
FIGS. 17a and 17b are schematic diagrams showing modifications to the positioning of the camera used in FIG. 15.
Figure 17B:
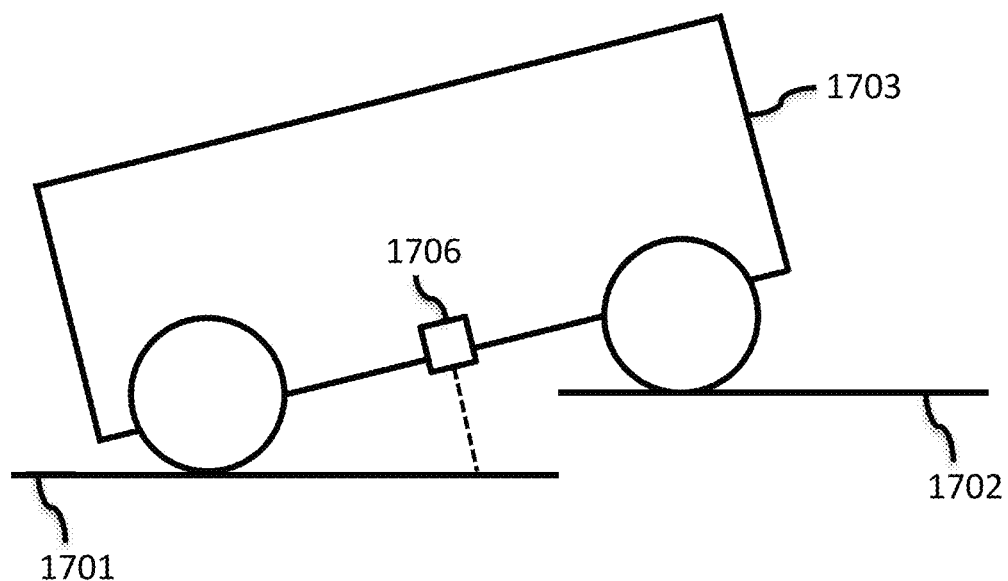

For example, as shown in FIGS. 17a and 17b, the first sensor 200/second sensor 300 may be located at a number of positions on the side of a transporting device 1703. As shown in FIG. 17a, the first sensor 200 may comprise two individual sensors 1704 and 1705. In one example, each sensor is positioned close to a wheel of the transporting device 1703. Moreover, the output of each individual sensor may be combined, through a weighting, to give a combined output as a measure of distance travelled by the transporting device 1703. Instead, only one of the two sensors may operate at one given time and therefore operation is switched between the sensors.

The particular setup shown in FIG. 17a may be useful when the grid is known to have areas of differing levels such as steps or other inconsistencies. For example, as shown in FIG. 17a, a first level of the grid 1701 and a second level of the grid 1702 are shown. In this example, the sensors 1704 and 1705 are envisaged to be camera arranged to determine the distance travelled by the transporting device 1703 by determining surface imperfections between successive images captured by the camera. Using a calibrated value of pixels per unit distance travelled by a surface imperfect tracked by the camera then the sensor is arranged to track how far, in pixels, a surface imperfection captured travels by comparing a first image with a second image. In this way, the distance travelled by the transporting device 1703 can be determined. However, the focus of each sensor 1704 and 1705 needs to be determined in advance so that the surface grid appears in a clear and sharp manner when imaged by the camera. This could be achieved using automatic focussing of each sensor however, this is mechanically complicated and may be prone to confusion by a grid surface formed from a reflective material.

Alternatively, each sensor 1704 and 1705 may have a fixed focus. This is acceptable where the surface of the grid is known to be a fixed distance from the sensor.

However, in the example show in FIG. 17a, the step in the grid between levels 1701 and 1702 may cause one of the sensors to be out of focus at one of the levels when the transporting device 1703 is transitioning from the first level 1701 to the second level 1702. In particular, at the grid transition one wheel of the transporting device 1703 is at a lower level that a second wheel of the transporting device 1703. Therefore, the distance between the sensor and the track will not be at a usual fixed distance. Therefore, it is advantageous to have each of the sensors arranged with a different level of focus, each focus configured for a different level i.e. a different distance between the sensor and the grid. In this way, at least one of the two sensors is arranged to correctly focus on the surface of the grid so as to correctly detect surface imperfections. The transporting device 1703 may switch between the sensors and select the appropriate sensor for the level of track currently being experienced.

Moreover, the transporting device 1703 may be provided with knowledge of the grid and those areas of the grid when step changes occur. In this way, the transporting device 1703 may pre-select a sensor so as to receive information about the distance travelled from the sensor which is not about to undergo a step change.

Alternatively, as shown in FIG. 17b, a single sensor 1706 may be employed but located in the middle (centrally) of the transporting device 1703. In this way, the average between the two steps is taken by the image captured by the step change. Therefore, the out of focus is reduced by half across all steps in the grid. This corresponding reduction in image focus issues may provide enough information to the transporting device 1703 to still effectively track surface imperfections and still provide information about the distance travelled by the transporting device 1703 even when there are steps in the surface of the grid.

Although the previous descriptions are described using a barcode reader and/or a camera which determine each of a position on the grid and/or a distance travelled on the grid which is turn rely on light. However, there are other systems which may be used to determine the position and/or measure the distance travelled. For example, magnetics (such as ferromagnetics, electromagnetics etc.) may be used. For example, instead of using a light sensor (such as a camera, barcode reader etc.) a Hall Effect sensor may be used on the transporting device to measure magnetic fields in proximity with the grid. The top surface of the grid may be embedded with strips of metal or the like (such as copper on a PCB, silver ink on a label etc.) which the non-contact Hall Effect sensor is arranged to read. For example, if strips of metal of a predetermined width are embedded in the grid with opposing polarities of magnetic field between each strip then by counting the number of changes in polarity of the magnetic field a distance travelled may be calculated by multiplying the number of changes of magnetic field by the predetermined width of each strip.

Alternatively, a portion of the grid may comprise magnetics arranged in a unique pattern from any other part of the grid. For example, a portion of the grid may comprise three strips of ferromagnetic material. A first portion may comprise the polarities North, North, South whilst a second portion of the grid may have magnetics arranged in a North, South, South pattern. In this way, the sensor may be arranged to detect the arrangement of ferromagnetic materials as the transporting device moves across the grid and, using a map corresponding the magnetic strips with locations on the grid, be able to determine the transporting device's absolute position based on magnetics alone.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A storage system comprising:
    a first set of parallel rails or tracks extending in an X-direction, and a second set of parallel rails or tracks extending in a Y-direction transverse to the first set in a substantially horizontal plane to form a grid pattern including a plurality of grid spaces, wherein a first rail of the first set or the second set of parallel rails includes a first barcode and a second rail of the first set or the second set of parallel rails includes a second barcode, the second rail being parallel and adjacent to the first rail;
    a plurality of stacks of containers located beneath the rails, and arranged such that each stack is located within a footprint of a single grid space;
    at least one transporting device, the at least one transporting device being arranged to: selectively move laterally in the X and Y directions, above the stacks on the first and second sets of parallel rails and transport containers, the transporting device including:
        a first sensor mounted on a first face of the transporting device and a second sensor mounted on a second face of the transporting device such that the first face is opposed to the second face; and
        a control unit arranged to control movement of the at least one transporting device, the control unit comprising:
        a receiving unit arranged to receive information from the first sensor and the second sensor; and
        a calculating unit arranged to calculate:
            i) a position of the first sensor and a position of the second sensor in accordance with the received information; and
            ii) a rotation of the transporting device relative to the first and second sets of parallel rails based on the position of the first sensor and the position of the second sensor.

2. The storage system according to claim 1, wherein the control unit is arranged to control movement of the transporting device in accordance with the calculated rotation of the transporting device.

3. The storage system according to claim 2, wherein the control unit is arranged to control the movement of the at least one transporting device to reduce the rotation of the at least one transporting device.

4. The storage system according to claim 1, in combination with the at least one transporting device, wherein the receiving unit is configured and arranged to receive information from a third sensor and a fourth sensor mounted on the at least one transporting device, wherein the first and second sensors are mounted on opposing faces of the at least one transporting device in a second direction, and the third and fourth sensors are mounted on opposing faces of the at least one transporting device in a first direction.

5. The storage system according to claim 4, wherein the calculating unit is configured and arranged to calculate a position and/or an orientation of the at least one transporting device based on the received information.

6. The storage system according to claim 1, wherein the at least one transporting device has a footprint that occupies only a single grid space in the storage system, such that a transporting device of the at least one transporting device occupying one grid space will not obstruct another transporting device of the at least one transporting device occupying or traversing adjacent grid spaces in the X and Y directions.

7. The storage system according to claim 1, wherein the first sensor and the second sensor are configured to detect the first location element and the second location element, respectively.

8. The storage system according to claim 1, wherein the first rail comprises a plurality of first barcodes and the second rail comprises a plurality of second barcodes.

9. The storage system according to claim 8, wherein the first rail comprises a first plurality of barcodes mounted along the centre of the first rail and the second rail comprises a second plurality of barcodes mounted along the centre of the second rail.

10. The storage system according to claim 9, wherein the first rail and/or the second rail comprise an axial depression, the axial depression being configured to receive an insert comprising a respective plurality of barcodes.

11. The storage system according to claim 1, wherein the first and second sensors comprise a camera or a barcode scanner.

12. The storage system according to claim 1, wherein the first and second sensors are arranged offset in a first direction with respect to each other.

13. A method of controlling movement of at least one transporting device, the at least one transporting device being arranged to transport containers, the containers being stored in a facility, the facility being arranged to store the containers in a plurality of stacks, the facility having a plurality of pathways arranged in cells so as to form a grid-like structure above the stacks, wherein the grid-like structure extends in a first direction and in a second direction, the at least one transporting device being arranged to operate on rails of the grid-like structure, the method comprising:
    receiving information from a first sensor mounted on a first face of the at least one transporting device;
    receiving information from a second sensor mounted on a second face of the transporting device, the first face being opposed to the second face;
    calculating a position of the first sensor and a position of the second sensor in accordance with the received information; and
    calculating a rotation of the at least one transporting device relative to the rails based on the position of the first sensor and the position of the second sensor.

14. The method according to claim 13, further comprising:
    receiving information from a third sensor and a fourth sensor mounted on the at least one transporting device, wherein the first and second sensors are mounted on opposing faces of the at least one transporting device in a second direction, and the third and fourth sensors are mounted on opposing faces of the at least one transporting device in a first direction.

15. The method according to claim 13, further comprising:
    controlling movement of the transporting device in accordance with the calculated rotation of the transporting device.

16. The method according to claim 15, further comprising:
    controlling the movement of the transporting device to reduce the rotation of the transporting device.

17. A transporting device for use with a storage system having:
    a first set of parallel rails or tracks extending in an X-direction, and a second set of parallel rails or tracks extending in a Y-direction transverse to the first set in a substantially horizontal plane to form a grid pattern comprising a plurality of grid spaces, wherein a first rail of the first set or the second set of parallel rails comprises a first barcode and a second rail of the first set or the second set of parallel rails comprises a second barcode, the second rail being parallel and adjacent to the first rail;

a plurality of stacks of containers located beneath the rails, and arranged such that each stack is located within a footprint of a single grid space;

the transporting device comprising:

a first set of wheels;

a second set of wheels;

a drive mechanism which can be used to drive the first set of wheels or the second set of wheels;

a cavity for receiving a container;

a lift device for transferring a container between the cavity and a stack within the storage system; and a control unit, the control unit being configured to, in use, perform operations including:

receiving information from a first sensor mounted on a first face of the at least one transporting device;

receiving information from a second sensor mounted on a second face of the transporting device, the first face being opposed to the second face;

calculating the position of the first sensor and the position of the second sensor in accordance with the received information; and calculating the rotation of the transporting device relative to the rails based on the position of the first sensor and the position of the second sensor.

* * * * *